(12) United States Patent
Kizaki

(10) Patent No.: US 7,369,256 B2
(45) Date of Patent: May 6, 2008

(54) INTERRUPTION OF JOB IN INFORMATION PROCESSING APPARATUS BY MEANS OF ACQUISITION AND RELEASE OF RESOURCES

(75) Inventor: Osamu Kizaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 850 days.

(21) Appl. No.: 10/207,125

(22) Filed: Jul. 30, 2002

(65) Prior Publication Data

US 2003/0020943 A1    Jan. 30, 2003

(30) Foreign Application Priority Data

| Jul. 30, 2001 | (JP) | ............................. 2001-229233 |
| Jul. 30, 2001 | (JP) | ............................. 2001-229234 |
| Jul. 16, 2002 | (JP) | ............................. 2002-207173 |

(51) Int. Cl.
G06F 9/46 (2006.01)
G06F 3/12 (2006.01)

(52) U.S. Cl. .................... 358/1.13; 358/1.16; 718/100; 718/102; 718/103; 710/264

(58) Field of Classification Search ...... 358/1.13–1.17, 358/401, 403, 296; 710/5, 7, 12, 48, 6, 58, 710/264; 399/151, 82, 411, 382; 700/28; 718/100, 102, 103

See application file for complete search history.

(56) References Cited

U.S. PATENT DOCUMENTS

| 5,245,368 | A | * | 9/1993 | Farrell et al. ................ 358/401 |
| 5,377,016 | A | * | 12/1994 | Kashiwagi et al. ......... 358/403 |
| 5,434,650 | A | | 7/1995 | Nakahara et al. |
| 5,485,246 | A | | 1/1996 | Hayashi et al. |
| 5,506,657 | A | * | 4/1996 | Ito et al. ...................... 399/411 |
| 5,510,876 | A | | 4/1996 | Hayashi et al. |
| 5,511,150 | A | * | 4/1996 | Beaudet et al. ............ 358/1.14 |

(Continued)

FOREIGN PATENT DOCUMENTS

EP    0 525 783    2/1993

(Continued)

OTHER PUBLICATIONS

U.S. Appl. No. 10/207,125, filed Jul. 30, 2002, Kizaki.

(Continued)

*Primary Examiner*—King Y. Poon
*Assistant Examiner*—Lennin R Rodriguez
(74) *Attorney, Agent, or Firm*—Oblon, Spivak, McClelland, Maier & Neustadt, P.C.

(57) ABSTRACT

An information processing apparatus, which attends to inputting and outputting of image data, and processes the image data by performing a job that uses a resource, includes a time-division resource allocation unit which performs the job by consecutively performing resource acquisition and release for job subsections into which the job is divided, a one-time resource allocation unit which performs the job without a break from a start to an end thereof by performing resource acquisition and release only once for the job, and a resource control unit which selects one of the time-division resource allocation unit and the one-time resource allocation unit to be applied to the job in response to a type of the job.

18 Claims, 22 Drawing Sheets

U.S. PATENT DOCUMENTS

| | | |
|---|---|---|
| 5,546,164 A | 8/1996 | Hayashi et al. |
| 5,583,615 A | 12/1996 | Hashimoto et al. |
| 5,694,201 A | 12/1997 | Hayashi et al. |
| 5,697,040 A * | 12/1997 | Rabjohns et al. .......... 399/382 |
| 5,774,356 A * | 6/1998 | Hisatake et al. ............ 700/28 |
| 5,784,663 A | 7/1998 | Hayashi et al. |
| 5,812,900 A | 9/1998 | Hashimoto et al. |
| 5,815,280 A * | 9/1998 | Ohmura et al. ............ 358/296 |
| 5,897,236 A | 4/1999 | Hashimoto et al. |
| 5,915,156 A | 6/1999 | Kizaki et al. |
| 5,923,826 A * | 7/1999 | Grzenda et al. ........... 358/1.15 |
| 5,966,564 A | 10/1999 | Kizaki et al. |
| 6,026,255 A | 2/2000 | Kizaki et al. |
| 6,122,457 A | 9/2000 | Kizaki |
| 6,347,203 B1 * | 2/2002 | Kutsuwada ................. 399/82 |
| 6,359,698 B1 * | 3/2002 | Kawaguchi ................ 358/1.16 |
| 6,504,621 B1 * | 1/2003 | Salgado ..................... 358/1.16 |
| 6,952,277 B1 * | 10/2005 | Ono .......................... 358/1.15 |
| 2002/0118387 A1 * | 8/2002 | Patton ....................... 358/1.15 |

FOREIGN PATENT DOCUMENTS

| | | |
|---|---|---|
| EP | 0 630 145 | 12/1994 |
| GB | 2 264 022 | 8/1993 |
| JP | 9-321962 | 12/1997 |
| JP | 10-289074 | 10/1998 |
| JP | 2001-127928 | 5/2001 |

OTHER PUBLICATIONS

U.S. Appl. No. 10/355,108, filed Jan. 31, 2003, Kizaki.
U.S. Appl. No. 10/207,125, filed Jul. 30, 2002, Kizaki.
U.S. Appl. No. 10/637,690, filed Aug. 11, 2003, Shindoh et al.
U.S. Appl. No. 10/692,792, filed Oct. 27, 2003, Kizaki et al.
U.S. Appl. No. 10/694,062, filed Oct. 28, 2003, Kizaki et al.
U.S. Appl. No. 10/667,302, filed Sep. 23, 2003, Shindoh et al.
U.S. Appl. No. 10/799,707, filed Mar. 15, 2004, Shindoh et al.
U.S. Appl. No. 10/849,827, filed May 21, 2004, Kizaki et al.

* cited by examiner

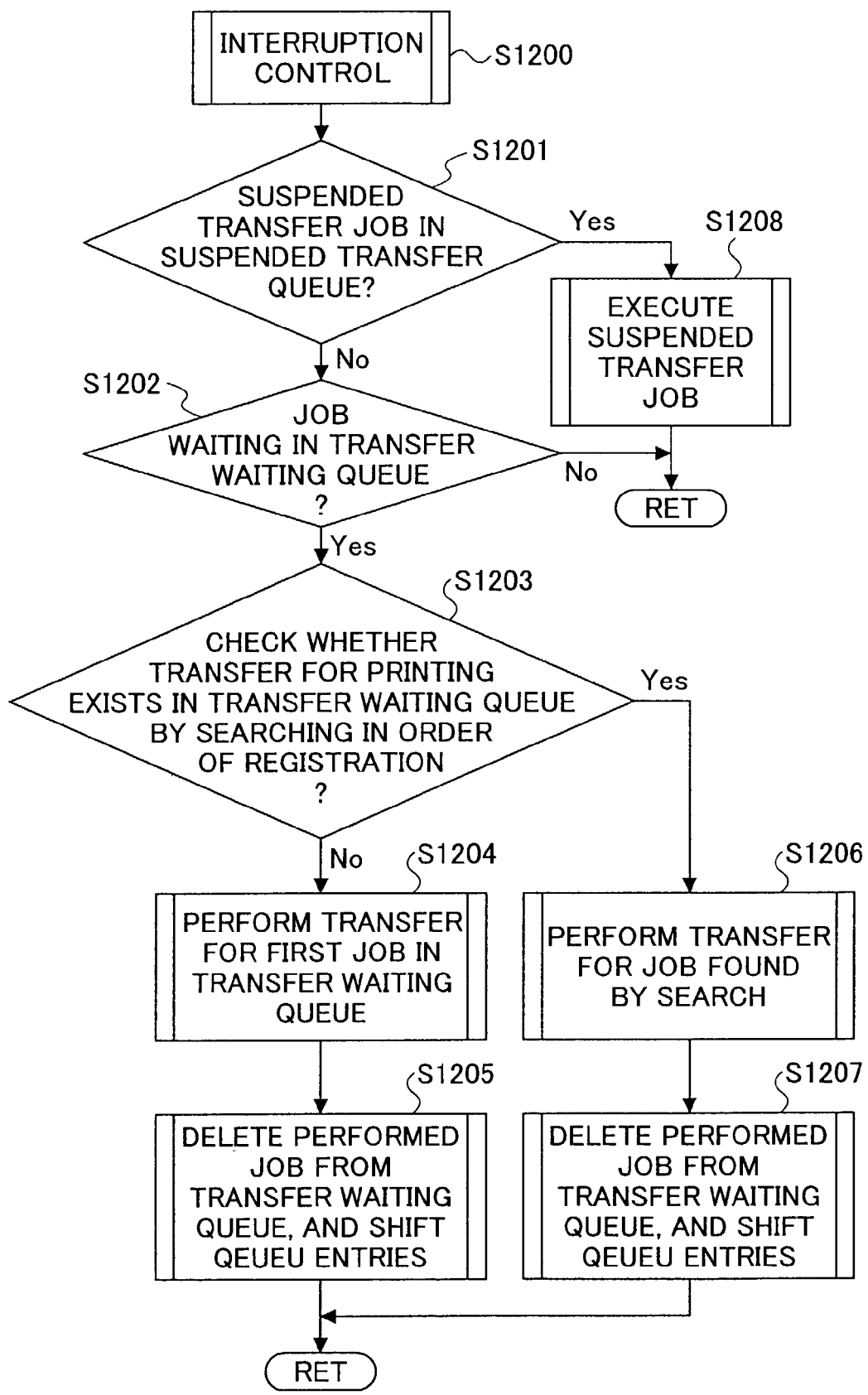

INTERRUPTION OF JOB IN INFORMATION PROCESSING APPARATUS BY MEANS OF ACQUISITION AND RELEASE OF RESOURCES

BACKGROUND OF THE INVENTION

1. Field of the Invention

The present invention generally relates to image processing apparatus, and particularly relates to an information processing apparatus such as a digital copier that attends to inputting and outputting of image data. The present invention further relates to a job control method used in the information processing apparatus, a program for performing the method, and a record medium that stores the program therein.

2. Description of the Related Art

Image forming apparatuses of today are equipped with a function to process images to be printed. In such apparatuses, image data subjected to image processing is stored in a secondary memory device such as a hard disk drive. At the time of printing, image data is transferred from the secondary memory device to a semiconductor memory prior to the printing thereof.

As an example of such an image forming apparatus, a description will be given below in respect of Japanese Patent Laid-open Application No. 9-321962. Data-transfer speed of a hard drive decreases as access to a track shifts towards an inner track. When a hard drive is used as a frame memory for page printing in an image forming apparatus, image data transfer may be skipped with respect to areas where data-transfer speed is low.

In consideration of this, image data of great importance may be stored in an area where the data-transfer speed is high, thereby preventing the reproduction of images of great importance from having degraded image quality. To this end, a data storage control unit of this laid-open document divides the memory area of the hard drive into sub-areas having varying transfer rates, and stores image data of high importance in the sub-areas of high transfer rates after the compression/expansion unit compresses the image data.

In recent years, as the digitalization of copier machines advances further, processing and editing of image data have been made more often than before by utilizing the fact that image data is stored in memory. For example, image data corresponding to a plurality of document pages is stored in memory first, and is then output repeatedly to produce a required number of copies of the document. This is called an electronic sorting function, and eliminates a need for sorting of paper sheets after the printing.

The electronic sorting function requires the image data of a plurality of pages to be stored in memory, so that the use of the semiconductor memory alone as a page memory will result in an excessive memory cost As a result, a general configuration employs both the semiconductor memory (as page memory) and the storage-purpose memory (i.e., a secondary data storage), and a hard drive or the like that is less expensive than semiconductor memory devices is typically used as the storage-purpose memory.

In the secondary data storage, data is sequentially written in a given order, and is sequentially read in the same order. When data stored in the secondary data storage is to be printed, the following procedure will be performed:

(1) transfer of image data from the secondary data storage (e.g., hard drive) to the semiconductor memory (i.e., page memory); and (2) outputting the image data of the semiconductor memory (page memory) to the printer unit.

In general, however, the transfer rate of the secondary data storage is slower than the image transfer rates of input/output operations, and the secondary data storage can only input a continuous stream of data having a certain data amount or output a continuous stream of data having a certain data amount. When images are to be printed, therefore, the time period required for the data transfer of the item (1) described above and the transfer timing thereof are important factors that need to be taken into consideration. Because of faster printing speed and more prevalent use of color printing in recent years, how to transfer image data from the secondary data storage to the semiconductor memory (i.e., page memory) as fast as it can at desired timing has become an important issue.

If the image data is not prepared before its use is required, the position of an image may be displaced on a transfer sheet, thereby creating the positional misplacement of an image. In the case of color printing, in particular, a miss copy may be produced that has MCYK colors displaced from each other.

Accordingly, there is a need for information processing apparatus for inputting and outputting image data that can perform processes at proper timing by controlling use of resources such as memory devices and scheduling jobs such as data outputting.

SUMMARY OF THE INVENTION

It is a general object of the present invention to provide an information processing apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an information processing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an information processing apparatus, which attends to inputting and outputting of image data, and processes the image data by performing a job that uses a resource. The information processing apparatus includes a time-division resource allocation unit which performs the job by consecutively performing resource acquisition and release for job subsections into which the job is divided, a one-time resource allocation unit which performs the job without a break from a start to an end thereof by performing resource acquisition and release only once for the job, and a resource control unit which selects one of the time-division resource allocation unit and the one-time resource allocation unit to be applied to the job in response to a type of the job.

In the information processing apparatus described above, under the control of the resource control unit, the time-division resource allocation unit is applied if the job is of a type that allows another job to interrupt, and the one-time resource allocation unit is applied if the job is of a type that prohibits another job from interrupting. Such control of the start and stop of a job based on the acquisition and release of resources makes it possible to perform a timing-critical process such as a print job in a preferential manner by interrupting another process and to perform a process for which timing is not critical by allowing interruption as necessary.

Other objects and further features of the present invention will be apparent from the following detailed description when read in conjunction with the accompanying drawings.

BRIEF DESCRIPTION OF THE DRAWINGS

FIG. 12 is a flowchart showing a procedure by which a transfer operation that follows an interrupting transfer operation is determined;

DESCRIPTION OF THE PREFERRED EMBODIMENTS

In the following, embodiments of the present invention will be described with reference to the accompanying drawings.

Figure 1:
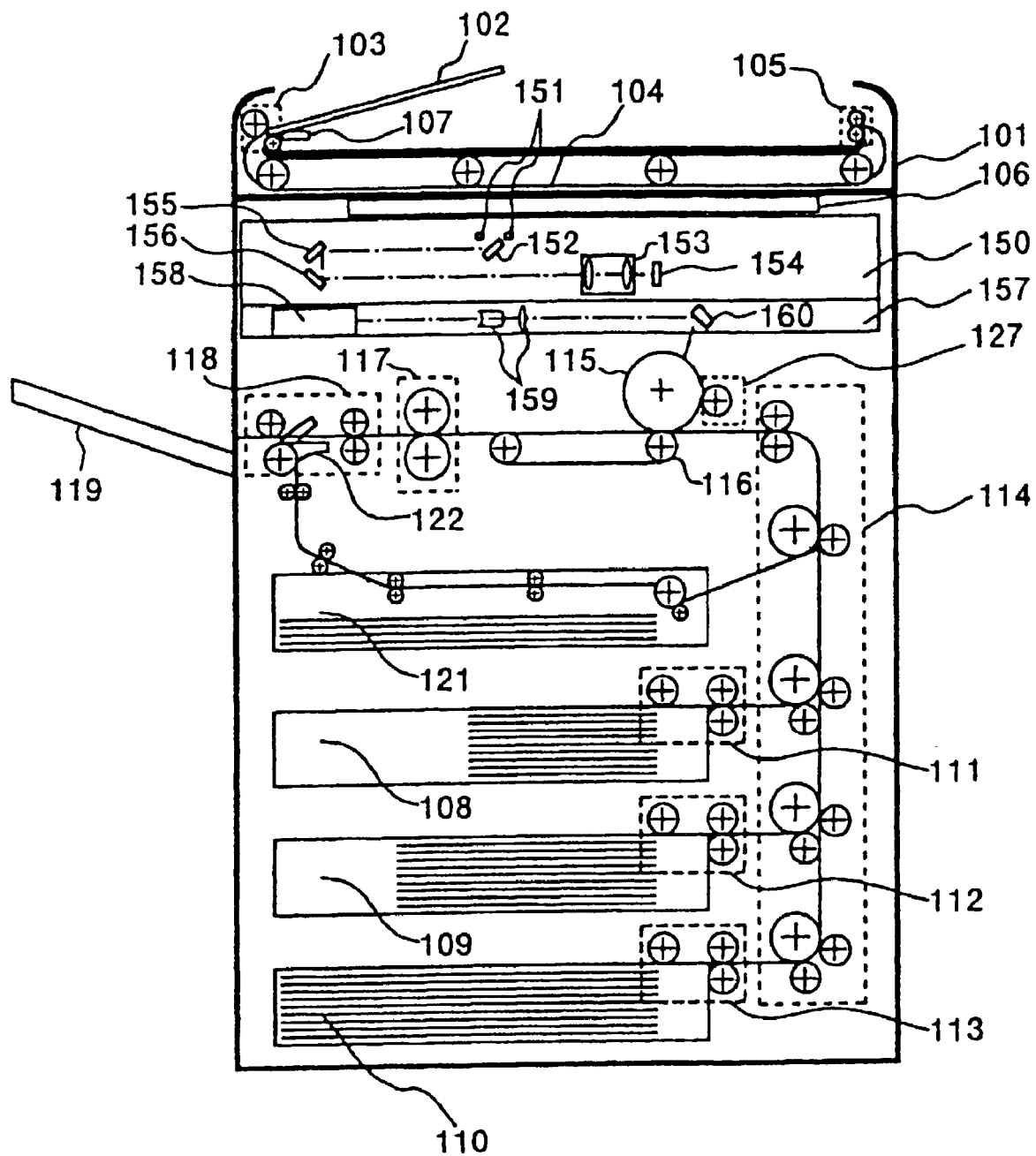
FIG. 1 is an illustrative drawing showing the entire configuration of an image forming apparatus as an example of an image processing apparatus according to the present invention.

FIG. 1 is an illustrative drawing showing the entire configuration of an image forming apparatus as an example of an image processing apparatus according to the present invention.

Figure 2:
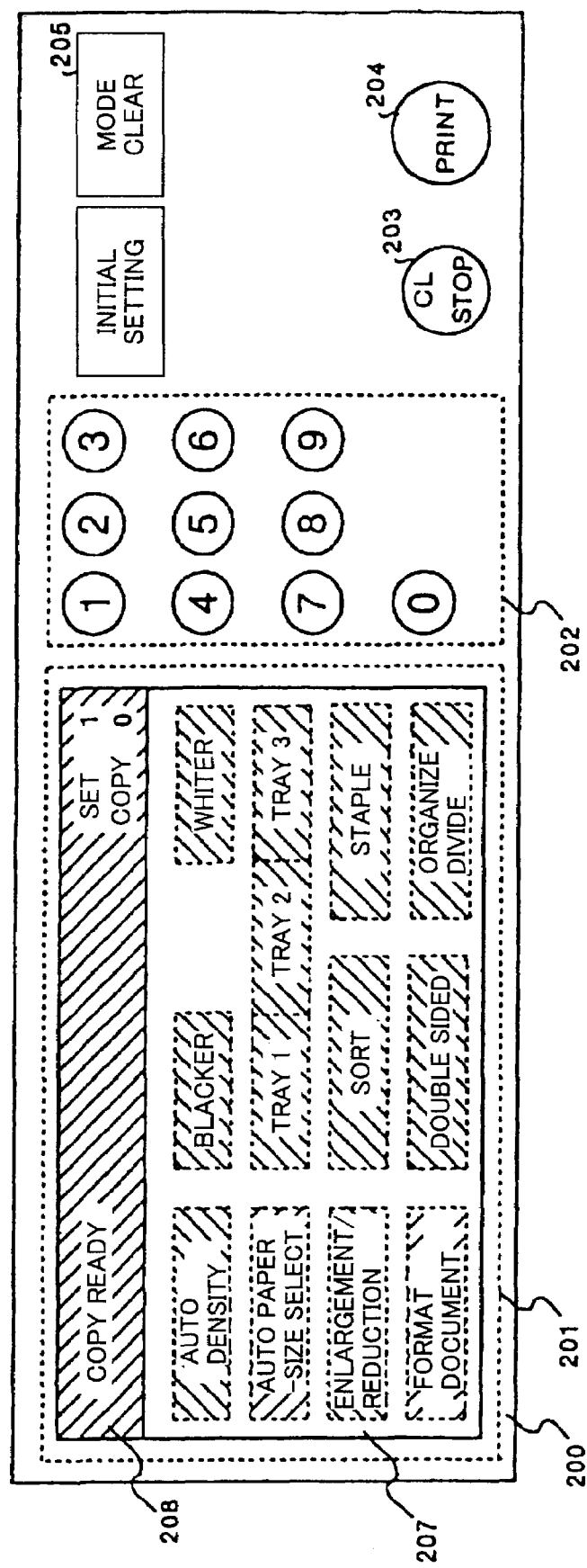
FIG. 2 is an illustrative drawing showing an example of the display of a liquid-crystal touch panel of an operation unit.

At the top of the apparatus, an automatic document feeder (hereinafter referred to as ADF) 101 is provided. A document tray 102 provided above the ADF 101 keep thereon a stack of document sheets, which have a printed side thereof facing upwards. When a start key (not shown) on an operation unit 200 shown in FIG. 2 is pressed, a sheet at the bottom of the stack of document sheets is supplied to a predetermined position on a contact glass 106 by feeder roller 103 and a feeder belt 104. The ADF 101 is provided with a count function that counts the number of document sheets by counting each sheet as the feeding thereof completes.

A scan unit 150 scans image data of the document sheet supplied on to the contact glass 106, and ejects the document sheets after the completion of scan by use of the feeder belt 104 and ejection rollers 105. If a document set detection unit 107 detects the presence of a next document sheet on the document tray 102, this document sheet is supplied on to the contact glass 106 in the same manner as the previous document sheet was supplied. The feeder roller 103, the feeder belt 104, and the ejection rollers 105 are driven by a conveyor motor 126 shown in FIG. 4.

The scan unit 150 includes the contact glass 106 for supporting a document sheet thereon and an optical scanning system. The optical scanning system includes an exposure lamp 151, a first mirror 152, a lens 153, and a CCD (image sensor) 154 among other things. The exposure lamp 151 and the first mirror 152 are fixedly mounted on a first carriage (not shown), and a second mirror 155 and a third mirror 156 are fixedly mounted on a second carriage (not shown).

When the image of a document is scanned, the first carriage and the second carriage are mechanically controlled to move at a 2-to-1 relative speed ratio such as to keep the optical path at a constant length. This optical scanning system is driven by a scanner drive motor (not shown). The image of a document sheet is captured by the CCD (image sensor) 154 to be transformed into electrical signals (image data).

An image forming unit 157 includes a laser output unit 158, an image forming lens 159, and a mirror 160. Inside the laser output unit 158, a laser diode serving as a laser light source is provided, and a polygon mirror that revolves by a motor at high constant speed is also provided.

The laser beam output from the image forming unit 157 is shone on a photosensitive body 115 of the image forming system. A beam sensor (not shown) for generating a main-scan synchronizing signal is provided on the photosensitive body 115 at an end point thereof that is illuminated by the laser beam.

At the bottom of the apparatus are provided three trays, i.e., a first tray 108, a second tray 109, and a third tray 110, which contain transfer sheets therein. The transfer sheets are carried by a first feeder apparatus 111, a second feeder apparatus 112, or a third feeder apparatus 113, and are conveyed by a vertical conveyor unit 114 to a position where the transfer sheets meet the photosensitive body 115.

The image data scanned by the scan unit 150 is recorded on the photosensitive body 115 by the laser beam output from the image forming unit 157. As the recorded surface of the photosensitive body 115 passes by a development unit 127, a toner image is formed thereon. A transfer sheet travels at constant speed matching the rotation of the photosensitive body 115, and the toner image on the photosensitive body 115 is transferred on to the transfer sheet. Thereafter, the transfer sheet has the toner image thereon fixed by a fixation unit 117, and is ejected to an ejected-sheet tray 119 by a sheet-ejection unit 118.

When both sides of the transfer sheet are to be printed, the transfer sheet having been supplied from one of the trays 108-110 and having an image formed thereon is not led to the ejected-sheet tray 119. Instead, a path-change hook 122 is set in an upper position, thereby supplying the transfer sheet to a double-sided-sheet unit 121.

The transfer sheet is then taken out of the double-sided-sheet unit 121 to be further subjected to the transfer of a toner image of the photosensitive body 115. The path-change hook 122 is set in a lower position so as to lead the transfer sheet to the ejected-sheet tray 119. The transfer sheet is supplied to the position where the photosensitive body 115 is situated, and has an image formed on the backside, followed by being ejected to the ejected-sheet tray 119. In this manner, the double-sided-sheet unit 121 is used to form images on the two sides of the transfer sheet.

The photosensitive body 115, a conveyor belt 116, the fixation unit 117, the sheet-ejection unit 118, and the development unit 127 are driven by a main motor, which will be described later. The driving force of the main motor is transmitted to the feeder apparatuses 111 through 113 through respective feeder transmission mechanisms, which will be later described. The driving force of the main motor is further transmitted to the vertical conveyor unit 114 via an intermediary transmission, which will be later described.

FIG. 2 is an illustrative drawing showing an example of the display of a liquid-crystal touch panel 201 of the operation unit 200. The operation unit 200 includes the liquid-crystal touch panel 201, a keypad 202, a clear/stop key 203, a print key 204, and a mode clear key 205. The liquid-crystal touch panel 201 displays function keys 207 and a message display field 208 for indicating the number of copies, the status of the image forming apparatus, etc.

Figure 3:
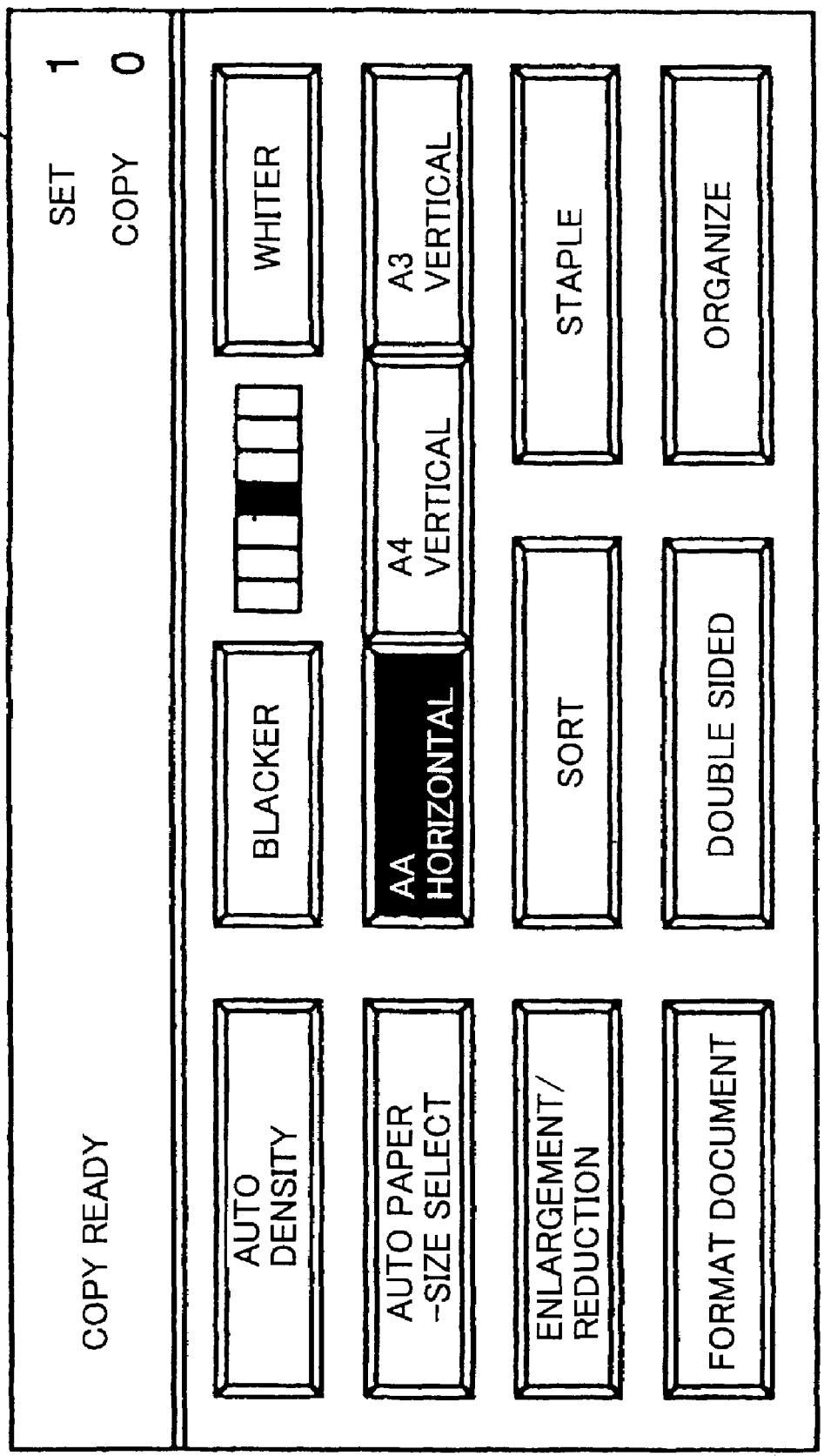
FIG. 3 is an illustrative drawing showing an example of the display of the liquid-crystal touch panel of the operation unit.

FIG. 3 is an illustrative drawing showing an example of the display of the liquid-crystal touch panel 201 of the operation unit 200. As the operator touches a key that is displayed on the liquid-crystal touch panel 201, the black and white appearance of the key is inverted to indicate the selection of the corresponding function (the illustrated example shows the selection of A4 horizontal sheet). When there is a need to specify details of functions (e.g., specifying a magnification factor in the case of a size change function), touching of an appropriate key results in a detail setting screen being displayed. Since the liquid-crystal touch panel 201 is implemented by use of a dot-based display unit, various forms suitable for various operations can be visually presented.

Figure 4:
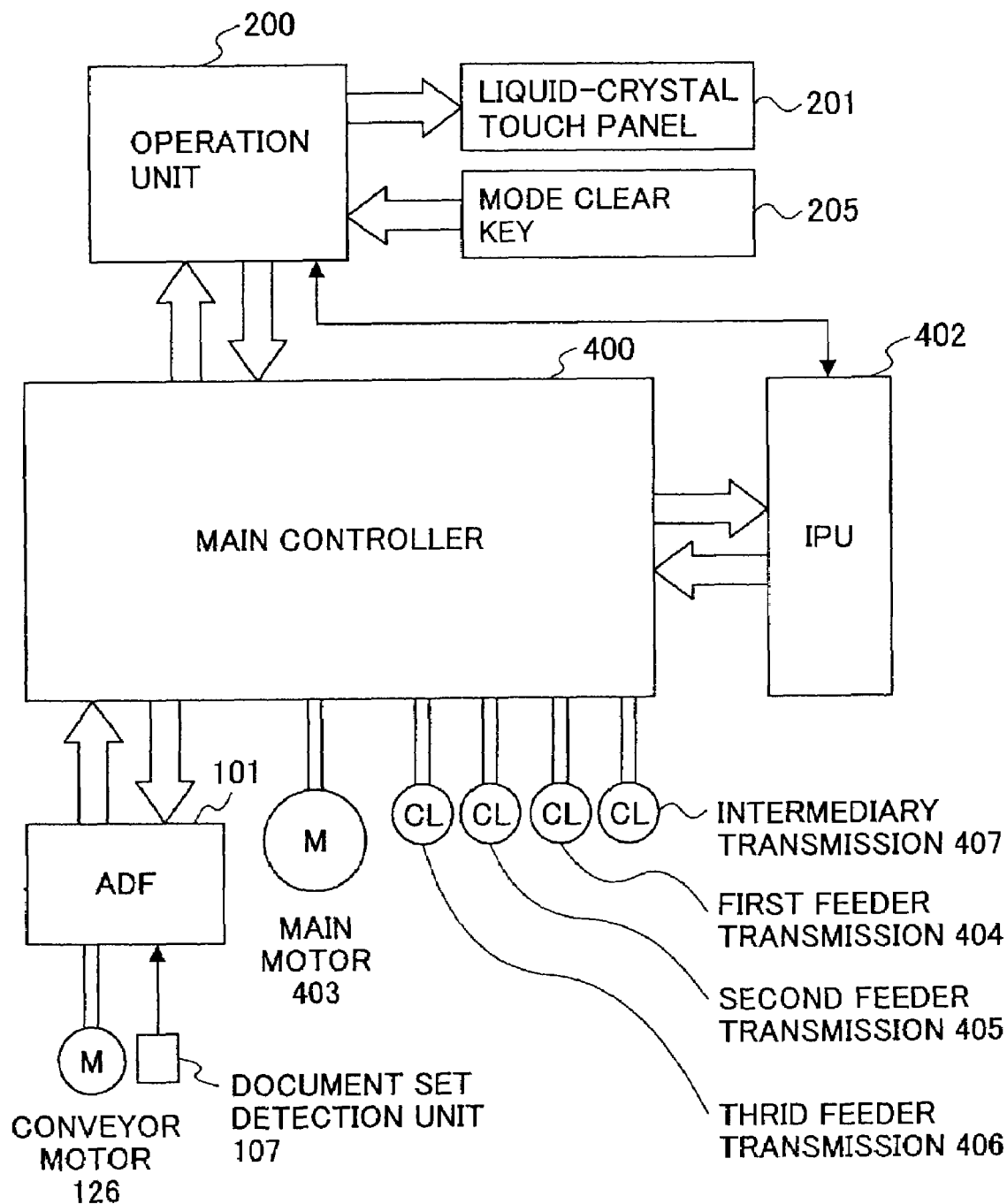
FIG. 4 is a block diagram of a control device of the image forming apparatus.

FIG. 4 is a block diagram of a control device of the image forming apparatus. A main controller 400 controls the overall operation of the image forming apparatus. The main controller 400 is connected to distributed control devices such as the operation unit 200, an image processing unit (IPU) 402, and an automatic document feeder apparatus 101. The operation unit 200 controls the display of information to an operator, and controls the inputting of functional settings made by an operator. The image processing unit 402 controls the operation of a scanner, the storing of document images in image memories, and the printing of images stored in the image memories.

Each distributed control device exchanges status information about the device and instructions regarding operations with the main controller 400 as such exchange becomes necessary. The main controller 400 is further connected to and controls a main motor 403, first through third feeder transmissions 404 and 406, and an intermediary transmission 407, which are used for the carrying of sheets as described above FIG. 5 is a block diagram showing the configuration of the image processing unit (IPU) 402. Reflection of light emitted by the exposure lamp 151 is photo-electrically converted by the CCD (image sensor) 154, followed by being converted into digital signals by an A/D converter 501. The image signals of the converted digital form are subjected to shading correction by a shading correction unit 502, and are further subjected to MTF correction and gamma correction by an image processing unit 503. The image signals are then enlarged or reduced in size according to the magnification factor by a size-change processing unit 512. Resulting signals are then output to a selector 504.

The selector 504 switches the destination of image signals by selecting either a writing gamma correction unit 511 or an image memory controller 505. The image signals passing through the writing gamma correction unit 511 have the writing gamma thereof corrected to conform to the image forming conditions, and are then supplied to the image forming unit 157. The selector 504 and the image memory controller 505 can exchange image signals in both directions.

Figure 5:
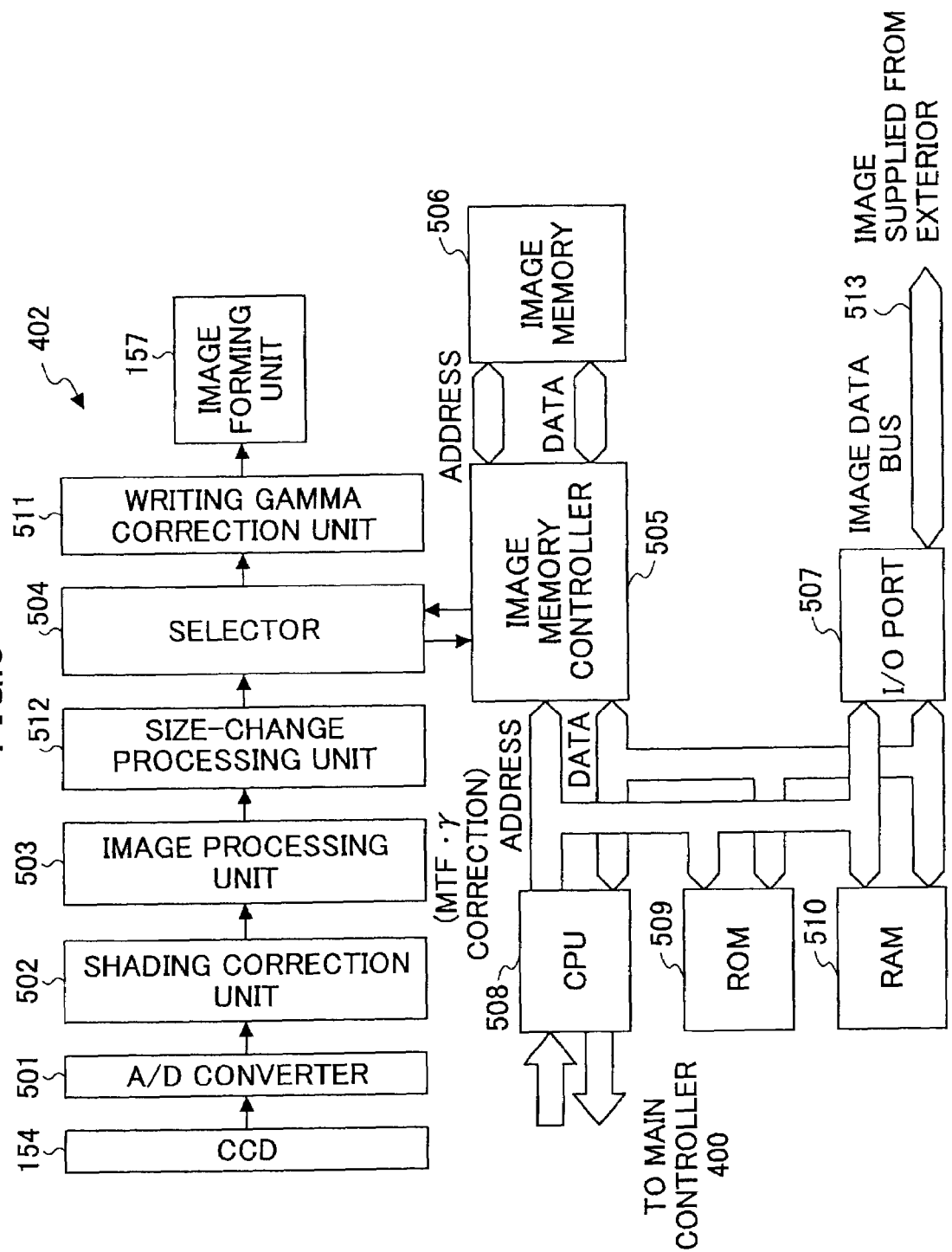
FIG. 5 is a block diagram showing the configuration of an image processing unit.

In FIG. 5, the image processing unit 402 is provided with a function (an I/O port 507 and an image data bus 513) to input/output image data, so that the image processing unit 402 can cope with not only image data supplied from the scan unit 150 but also image data supplied from an external source (e.g., data supplied from a data processing device such as a personal computer).

A CPU 508 controls settings to the image memory controller 505 and the operation of the scan unit 150 and the image forming unit 157. A ROM 509 and a RAM 510 store therein programs and data used by the CPU 508. The CPU 508 writes and reads data in and from an image memory 506 through the image memory controller 505. Although not shown, the CPU 508 is connected to the operation unit 200. FIG. 5 shows the address and data regarding the inputting/outputting of image data.

Figure 6:
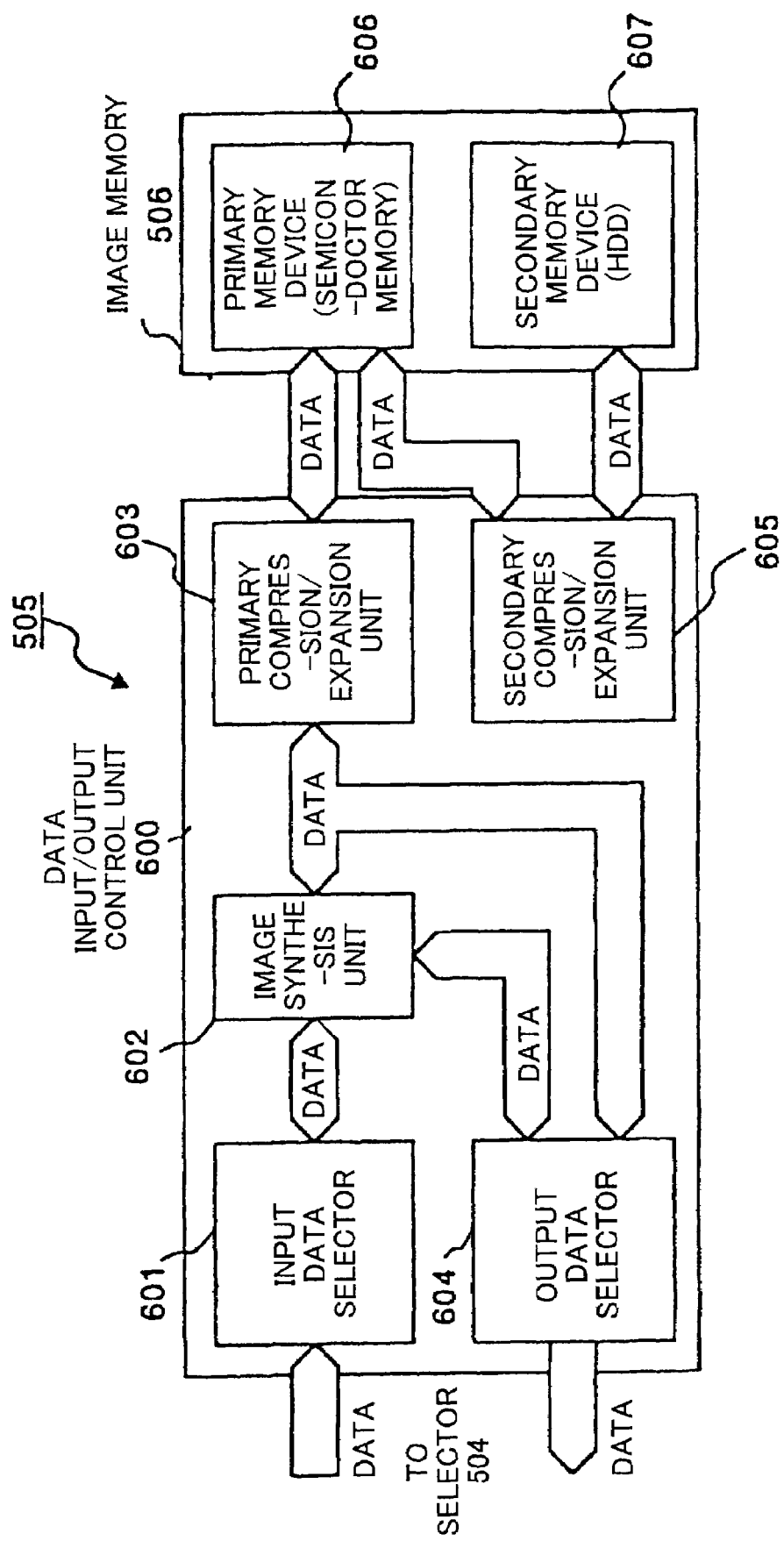
FIG. 6 is a block diagram showing the configuration of an image memory controller and an image memory.

FIG. 6 is a block diagram showing the configuration of the image memory controller 505 and the image memory 506. The image memory controller 505 includes a data input/output control unit 600, which in turn includes an input data selector 601, an image synthesis unit 602, a primary compression/expansion unit 603, an output data selector 604, and a secondary compression/expansion unit 605. Setting of control data in each unit is made by the CPU 508 shown in FIG. 5.

The image memory 506 includes a primary memory device 606 and a secondary memory device 607. A memory such as a DRAM that is capable of high speed access is used as the primary memory device 606 in order to insure that the writing/reading of data at a specified area of memory can be performed in conformity to the required speed of data transfer at the time of inputting/outputting of image data. The primary memory device 606 has an interface unit connected to the image memory controller 505. This interface unit is configured to achieve simultaneous inputting and outputting of image data through division into areas according to the size of image data to be processed.

The secondary memory device 607 is implemented by use of a mass-storage nonvolatile memory for synthesizing and/or sorting scanned images and storing image data. If the primary memory device 606 is a nonvolatile memory that has a sufficiently large memory size to warrant the processing of image data, there is no need to input/output data into/from the secondary memory device 607. Further, if the secondary memory device 607 is capable of writing/reading data in conformity with the required speed of data transfer at the time of image inputting/outputting, then, direct writing/reading of data into/from the secondary memory device 607 would be possible. In the cases described here, the image memory 506 can attend to data processing without discriminating the primary memory and the secondary memory.

Where the secondary memory device 607 cannot perform data writing/reading such as to satisfy the required speed of data transfer at the time of image inputting/outputting, such as in the case of a hard drive or an optical-magnetic disk drive being used as the secondary memory device 607, the presence of the primary memory device 606 will help the data transfer capacity of the secondary memory device 607 at the time of data inputting/outputting into/from the secondary memory device 607.

In the following, a description will be given with regard to the application-specific details of operations of the primary memory device 606 and the secondary memory device 607 of the image memory 506.

EXAMPLE 1

Single Copy in Copying Application

In the case of a single copy, image data captured by the scanner (CCD 154) is input into the primary memory device 606 of the image memory 506. Substantially at the same timing, the image data is also output to the image forming device (i.e., the image forming unit 157). Further, the image data is stored in the secondary memory device 607. After the image forming unit 157 finishes the image forming process without any trouble, the data stored in the secondary memory device 607 is eliminated without even being used. If paper jamming or the like occurs, however, the image data of the secondary memory device 607 is retrieved and output to the image forming unit 157. In this manner, the recapture of an image by use of the scanner (CCD 154) is not necessary even if there is a need to output the image data to the image forming unit 157 the second time due to the occurrence of paper jamming or the like.

EXAMPLE 2

Sorting in Copying Application (Multiple Copy)

In the case of two or more copies, image data captured by the scanner (CCD 154) is input into the primary memory device 606. In respect of the first copy, the image data is output from the primary memory device 606 to the image forming device (i.e., the image forming unit 157), and is also stored in the secondary memory device 607 in the same manner as in the example 1. In respect of the second and following copies, the image data is output from the secondary memory device 607, the primary memory device 606, to the image forming device (the image forming unit 157), thereby making it unnecessary to recapture an image by the scanner (CCD 154) for the second and following copies. As the required number of copies are printed, the image data stored in the secondary memory device 607 is deleted.

EXAMPLE 3

Storing Image Captured by Scanner

In this case, image data captured by the scanner (CCD 154) is stored in the secondary memory device 607 via the primary memory device 606. Unless a deliberate action is taken to delete data, the image data remains in the secondary memory device 607. After the image data is retrieved for use in copy printing, for example, the image data may be deleted.

EXAMPLE 4

Printing from External Input Device (e.g., Personal Computer)

In this case, image data is input from an external input apparatus via an I/O port 507, rather than from the scanner. Other details are the same as in the example 1 or the example 2.

EXAMPLE 5

Storing Image Supplied from External Input Device

In this case, the source of image data is not the scanner but the external input apparatus. Other details are the same as in the example 3.

EXAMPLE 6

Printing Stored Image

In order to print the image data stored in the secondary memory device 607 as in the example 3 or 5, the image data is supplied from the secondary memory device 607, the primary memory device 606, to the image forming device (the image forming unit 157) for printing thereof.

In what follows, a description will be given based on FIG. 6 with regard to the input/output processing of image data by the image memory controller 505 (i.e., the data input/output control unit 600). In so doing, it is assumed that data writing/reading of the secondary memory device 607 cannot match the data transfer speed required for image inputting/outputting operations.

<1> Image Inputting (Storing Image in Image Memory 506)

The input data selector 601 selects, from a plurality of data images, image data that is to be stored in the image memory (the primary memory device 606).

The image data selected by the input data selector 601 is supplied to the image synthesis unit 602 where image synthesis is carried out as necessary.

The image data processed by the image synthesis unit 602 is compressed by the primary compression/expansion unit 603, followed by being stored in the primary memory device 606. The data stored in the primary memory device 606 is further compressed by the secondary compression/expansion unit 605, followed by being stored in the secondary memory device 607 as necessary.

<2> Image Outputting (Reading Image from Image Memory 506)

At the time of image outputting, image data stored in the primary memory device 606 is retrieved. If the image data desired for outputting is stored in the primary memory device 606, the primary compression/expansion unit 603 expands the image data of the primary memory device 606, and, then, the expanded data is selected by the output data selector 604 to be output. Alternatively, the expanded data is synthesized with input data before it is selected by the output data selector 604 to be output. If the image data desired for outputting is stored in the secondary memory device 607, the relevant image data of the secondary memory device 607 is expanded by the secondary compression/expansion unit 605, and is then stored in the primary memory device 606. Thereafter, the image outputting operation with respect to the primary memory device 606 as described above will be performed.

Figure 7:
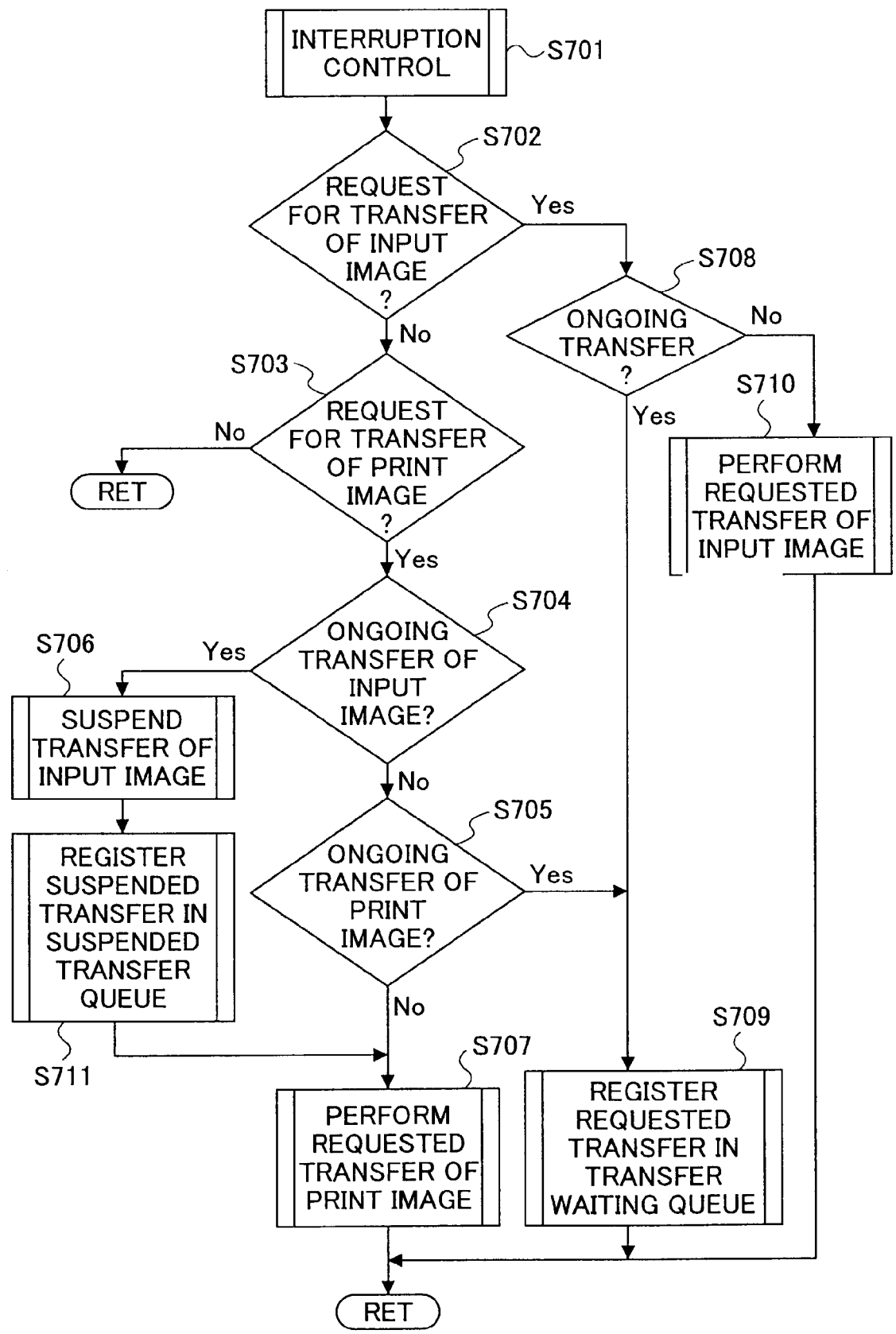
FIG. 7 is a flowchart of a process performed when a request is made to transfer data from a secondary memory device to a primary memory device.

In the following, a flowchart of FIG. 7 will be used to describe the transfer of image data. FIG. 7 is a flowchart of a process performed when a request is made to transfer data from the secondary memory device 607 to the primary memory device 606.

A transfer request is made (step S701). A check is then made as to whether the request is directed to image inputting (step S702) or directed to image printing (step S703).

If the transfer request is for image inputting (Yes at step S702), it is checked whether transfer is currently underway (step S708). If transfer is currently underway (Yes at step S708), a requested transfer is registered in a transfer waiting queue (step S709). If transfer is not currently underway (No at step S708), the requested transfer for image inputting is carried out (step S710). The procedure comes to an end.

If the transfer request is not for image inputting (No at step S702), a check is made as to whether the transfer request is directed to image printing (step S703). If there is no transfer request (No at step S703), the procedure comes to an end. If the transfer request is for image printing (Yes at step S703), a check is made as to whether there is ongoing transfer for image inputting (step S704).

If there is ongoing transfer for image inputting (Yes at step S704), the ongoing transfer for image inputting is suspended (step S706), and a suspended transfer is registered in a suspended transfer queue (step S711), followed by carrying out the operation of step S707. If there is no ongoing transfer for image inputting (No at step S704), a check is made as to whether transfer for image printing is currently underway (step S705).

If there is ongoing transfer for image printing (Yes at step S705), step S709 as described above is performed, and the procedure comes to an end. If there is no ongoing transfer (No at step S705), step S707 is performed. At step S707, the requested transfer for image printing is performed. The procedure then comes to an end.

Among the procedures described above, a series of steps "step S702, step S708, step S710" and a series of steps "step S702, step S703, step S704, step S705, step S707" can perform the requested transfer without suspending an ongoing transfer operation.

On the other hand, a series of steps "step S702, step S703, step S704, step S705, step S709" is directed to a case in which a request for image printing is made while transfer for other image printing is underway.

Figure 8:
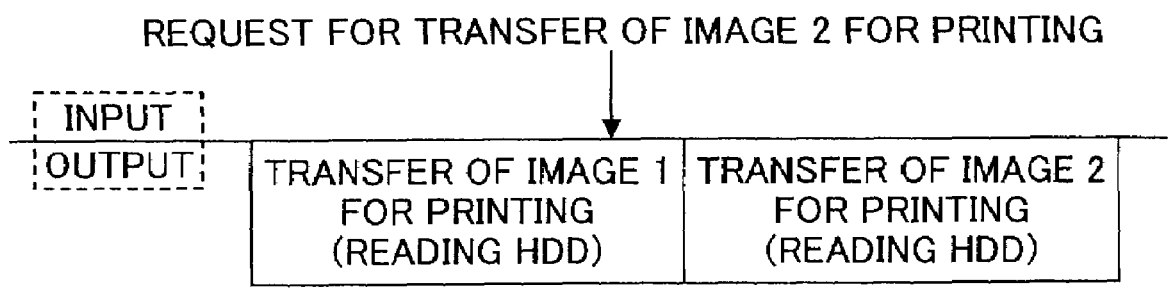
FIG. 8 is a timing chart showing the operation of image transfer with regard to a case in which a request for image printing is made while transfer for other image printing is underway.

FIG. 8 is a timing chart showing the operation of image transfer with regard to a case in which a request for image printing is made while transfer for other image printing is underway. In FIG. 8, "HDD" refers to a hard drive used as the secondary memory device 607. In this example, the transfer of image 1 for printing is not interrupted by the transfer of another image 2 for printing. This provision insures that preparation for printing of image 2 is completed while the transfer of image 1 for printing is being performed by virtue of a prior request. This achieves prioritized printing, and attains highly efficient printing by preparing print images reliably at high speed.

Figure 9:
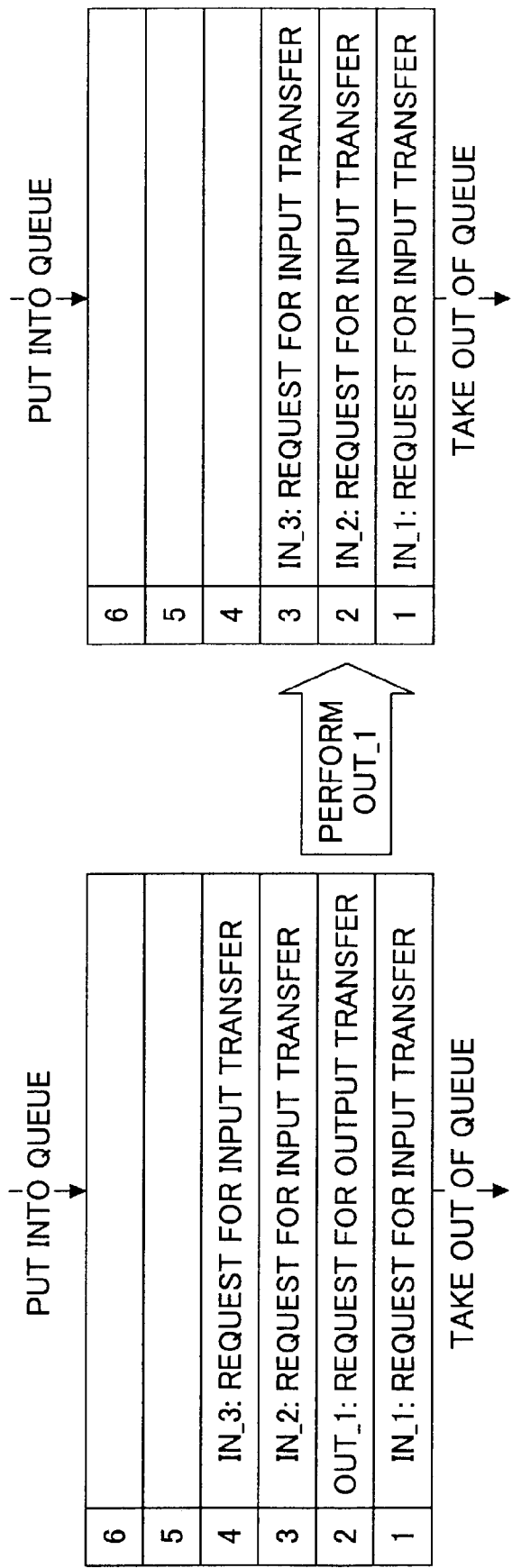
FIG. 9 is an illustrative drawing showing a transfer waiting queue.

When transfer is let wait, transfer processes are successively performed in an order in which they are waiting as shown in FIG. 9. A requested transfer is registered in the transfer waiting queue shown in FIG. 9 at step S709 of FIG. 7.

As transfer requests are accumulated in the queue, the state shown in FIG. 9 indicates that IN_1, OUT_1, IN_2, and IN_3 are registered in this order in the queue. When new registration is requested, a new entry is entered at slot No. 5 as it is available in the queue. Here, "IN" refers to a transfer process for input image data, and "OUT" refers to a transfer process for output image data (for printing).

Figure 10:
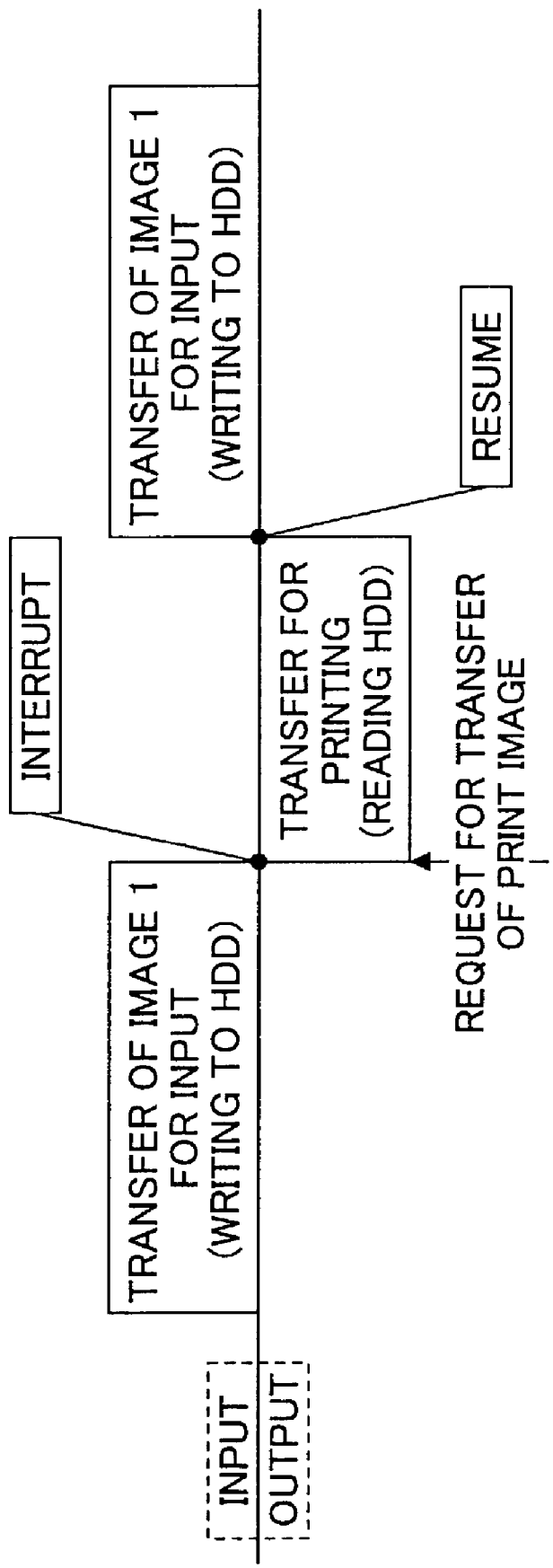
FIG. 10 is a timing chart showing the operation of image transfer.

A series of steps "step S702, step S703, step S704, step S706, step S711, step S707" corresponds to a case in which a request for image printing is made while the transfer of another input image is underway. FIG. 10 is a timing chart showing the operation of image transfer of such a case.

In this example, the transfer of input image 1 is suspended, and the transfer of print image 2 is allowed to interrupt. This achieves a procedure that puts printing ahead of image inputting, and attains highly efficient printing by preparing print images reliably at high speed.

It should be noted that it is the data transfer from the primary memory device 606 to the secondary memory device 607 that is interrupted, and the storing of image data captured by the scanner in the primary memory device 606 is not suspended. An operation that captures image data by the scanner may be performed only when a sufficient memory space for storing the image data is secured in the primary memory device 606, and, thus, can be let wait until the memory space is secured to provide a standby state. Even when the transfer of print data from the secondary memory device 607 to the primary memory device 606 interrupts, all that is suspended is the data transfer of input data from the primary memory device 606 to the secondary memory device 607. It does not necessarily follow that the storing of image data captured by the scanner in the primary memory device 606 is suspended.

A series of steps "step S702, step S708, step S709" corresponds to a case in which the transfer of input image is requested while the transfer of another input image is underway, or in which the transfer of input image is requested while the transfer of another image for printing is underway. FIG. 11 is a timing chart showing the operation of image transfer of such a case.

Figure 11A:
FIG. 11 is a timing chart showing the operation of image transfer.

As shown in FIG. 11A, when the transfer of image 2 for inputting is requested during the transfer of image 1 for inputting, the transfer of image 2 for inputting does not interrupt the transfer of image 1 for inputting. Namely, the transfer that is requested first is performed first. This results in the resources of the primary memory device 606 being more likely to be available, thereby achieving efficient use of the resources. This can prevent the prolonged use of resources (i.e., the prolonged use of the primary memory device 606) that may occur when a subsequent input is allowed to interrupt, or when the subsequent input is performed concurrently with a prior input.

Figure 11B:
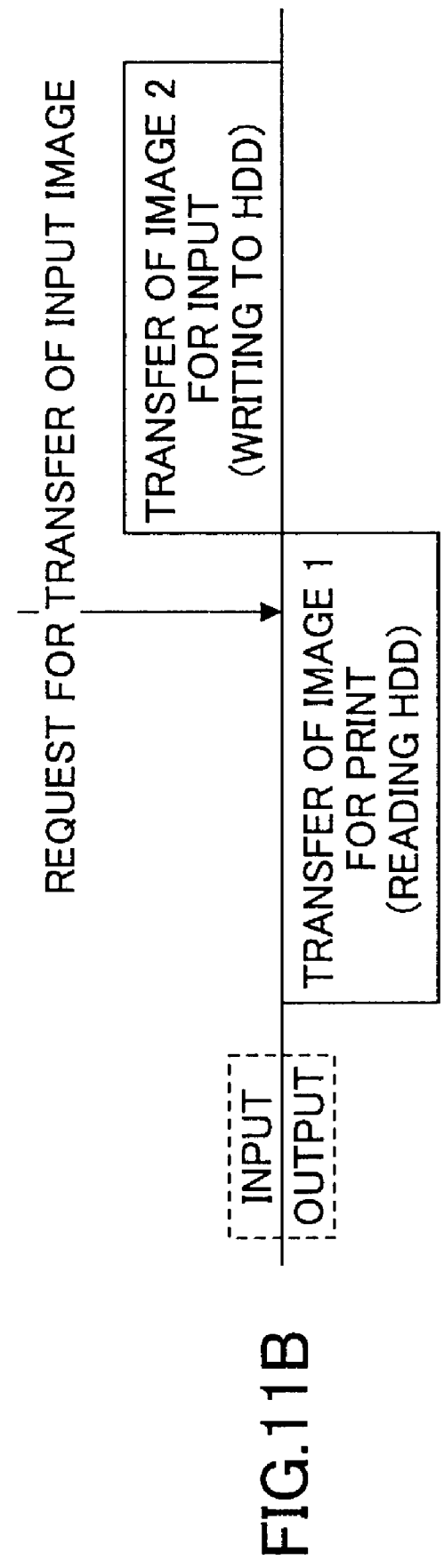

As shown in FIG. 11B, when the transfer of image 2 for inputting is requested during the transfer of image 1 for printing, priority is given to the printing of image 1, and the transfer of image 2 is set aside for the time being. This achieves prioritized printing, and attains highly efficient printing by preparing print images reliably at high speed.

A unit of image data transfer that takes into account interruption during a transfer process is smaller than one image with respect to the data transfer for image inputting from the primary memory device 606 to the secondary memory device 607. With respect to the data transfer for image printing from the secondary memory device 607 to the primary memory device 606, a unit of image data transfer is one image that is to be printed by one printing operation (one image forming operation). This achieves the prioritized control of image data output at the time of printing, thereby increasing the printing speed.

FIG. 12 is a flowchart showing a procedure by which a transfer operation that follows the interrupting transfer operation is determined. When a current transfer operation comes to an end, a procedure for determining the next transfer operation is performed.

As previously described, the transfer suspending process is carried out at step S711 (FIG. 7) to register the suspended transfer in the suspended transfer queue. In this context, a check is made as to whether there is an entry in the suspended transfer queue (step S1201). If an entry (job) is found (Yes at step S1201), the relevant suspended transfer is restarted to resume the operation thereof (step S1208). The procedure for the next transfer process then comes to an end.

If there is no suspended transfer (No at step S1201), a check is made as to whether there is a waiting transfer (job) in the transfer waiting queue (step S1202). An entry in the transfer waiting queue is made at step S709 of FIG. 7 when there is an ongoing transfer process.

If there is an entry in the transfer waiting queue (Yes at step S1202), a transfer operation to be performed next will be determined If there is no entry (No at step S1202), the procedure for determining the next transfer process comes to an end.

Determination of the transfer job to be performed next is generally made in the order in which entries were put in the queue (i.e., first-in first-out). Since image data needs to be ready at the time of printing without failure when printing is given priority, however, the operation will vary depending on whether a transfer process for printing is present in the queue. Because of this, a search is made in the transfer waiting queue in the order in which the entries were registered, thereby checking whether a transfer request for printing is present (step S1203).

If step S1203 gives "Yes", a series of steps "step S1203, step S1206, step S1207" will be performed. Since there is an entry for printing transfer, this printing process is given priority. In order to prepare image data by the time of printing, the transfer process for printing that is found in the queue is performed out of turn. In this case, the transfer request OUT_1 in the queue on the left-hand side of FIG. 9 is performed first, so that the queue will be updated as shown on the right-hand side of FIG. 9.

If step S1203 gives "No", a series of steps "step S1203, step S1204, step S1205" will be performed. Since there is no entry for printing transfer, transfer processes in the queue are performed in the order in which they were put in the queue (e.g., the order of the entries shown on the left-hand side of FIG. 9).

The transfer process that has just been carried out is removed from the transfer waiting queue, with the following entries being shifted forward to update the transfer waiting queue (step S1205, step S1207).

Figure 13:
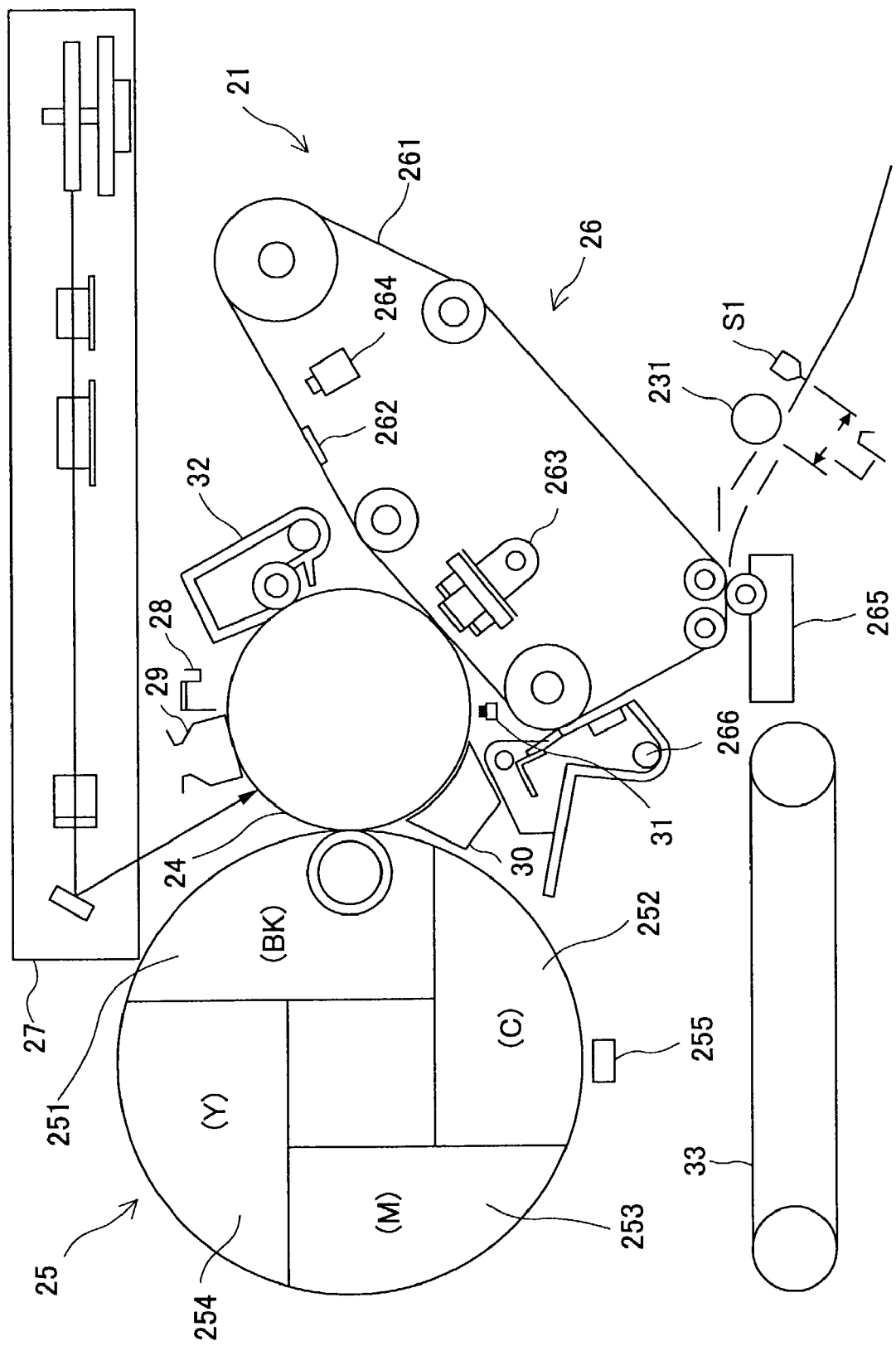
FIG. 13 is an illustrative drawing showing an example of the configuration of a color printing unit of a single-drum type.

The control of image data transfer as described above has a general merit in that the image data for printing is prepared at high speed to achieve efficient printing operations. An advantage of this control is especially noticeable to achieve reliable printing operations when this control is applied to color printing as described in the following, FIG. 13 is an illustrative drawing showing an example of the configuration of a color printing unit of a single-drum type. The configuration of FIG. 13 corresponds to a portion of FIG. 1 that includes the photosensitive body 115, the image forming unit 157, the development unit 127, and the conveyor belt 116.

In FIG. 13, an image forming unit 21 includes a photosensitive body 24, a revolver unit 25, a transfer unit 26, and an imaging unit 27. Around the photosensitive body 24 are provided an electric discharge lamp 28, an electric charger 29, the revolver unit 25, a toner-amount sensor 30, an electric discharge lamp 31, the transfer unit 26, and a drum cleaning unit 32. As the photosensitive body 24 revolves, a surface portion of the photosensitive body passes by the above-identified units in the order as mentioned, thereby being subjected to processing by these units. The revolver unit 25 includes development units 251, 252, 253, and 254 corresponding to black Bk, cyan C, magenta M, and yellow Y, respectively, and further includes a revolver home-position sensor 255.

The transfer unit 26 includes an intermediary transfer belt 261 having a reference mark 262 thereon and supported by a plurality of rollers, a belt transfer charger 263, a mark sensor 264 for detecting the reference mark 262, a paper transfer charger 265, and a belt cleaning unit 266. The intermediary transfer belt 261 may have a length twice as long as the circumference of the photosensitive body 24, and is configured to allow two images to be formed thereon in the same color as the photosensitive body 24 fully revolves twice. A resist roller 231 is provided upstream relative to the paper transfer charger 265 for the purpose of feeding paper sheets. A front-end-detection sensor S1 is provided further upstream for the purpose of detecting a front end of a transfer sheet at a distance Lr from the resist roller 231.

In the color printing unit of FIG. 13, a full-color image is formed as follows.

In the image forming unit 21, the photosensitive body 24 and the intermediary transfer belt 261 rotate. As the mark sensor 264 of the transfer unit 26 detects the reference mark 262 on the intermediary transfer belt 261, the reading of black-Bk image data from the memory (i.e., the primary memory device 606 of FIG. 6) is started at the predetermined timing that is defined relative to the detection of the mark. Based on the black-Bk image data, the imaging unit 27 forms an electrostatic latent image on the photosensitive body 24. The electrostatic latent image formed on the photosensitive body 24 is visualized by the black-Bk development unit 251 of the revolver unit 25. The visualized black-Bk image is transferred on to the intermediary transfer belt 261 by the belt transfer charger 263 at predetermined timing that is defined relative to the detection of the reference mark 262.

After the transfer of the black-Bk image that is the first color is completed, the revolver unit 25 revolves so as to bring the cyan-C development unit 252 in contact with the photosensitive body 24. Thereafter, a cyan-C image is formed on the photosensitive body 24 in the same manner as described above, and is then transferred on to the intermediary transfer belt 261 at predetermined timing that is defined relative to the detection of the reference mark 262. This superimposes the second-color cyan-C image on the first color black-Bk image. The image formation and transfer as described above are repeated for the remaining colors, magenta M and yellow Y, thereby forming a full-color toner image on the intermediary transfer belt 261 at a predetermined position.

The full-color toner image formed on the intermediary transfer belt 261 is further transferred on to a transfer sheet by the paper transfer charger 265. The transfer sheet having the image transferred thereon is sent to the fixation unit by a record-sheet conveyor belt 33, followed by being ejected out of the apparatus after the fixation of the image. After the transfer of the image on to the transfer sheet, the belt cleaning unit 266 comes in contact with the intermediary transfer belt 261 so as to remove toner remaining on the surface of the intermediary transfer belt 261, thereby preparing for the formation of a next image.

Figure 14:
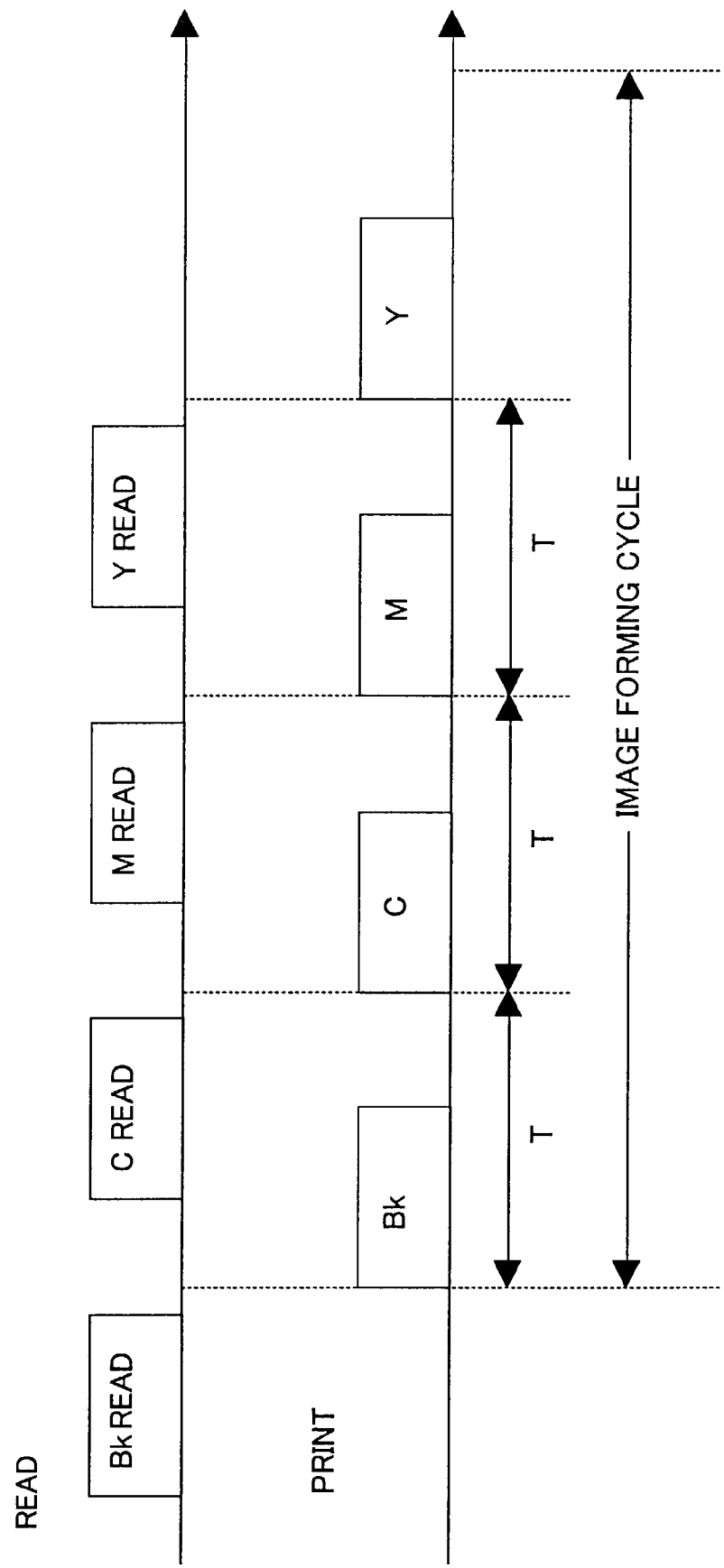
FIG. 14 is an illustrative drawing for explaining the operation of successive printing of black Bk, cyan C, magenta M, and yellow Y.

FIG. 14 is an illustrative drawing for explaining the operation of successive printing of black Bk, cyan C, magenta M, and yellow Y as described above.

In the color printing unit of the single-drum type as described above, image data stored in the primary memory device 606 is retrieved at the time of printing, and the imaging unit 27 forms an electrostatic latent image on the photosensitive body 24 in accordance with the retrieved image data. Accordingly, if the image data to be printed is stored in the secondary memory device 607, the image data to be printed needs to be transferred first from the secondary memory device 607 to the primary memory device 606.

The primary memory device 606 constitutes a page memory that has a memory space controlled by the unit of one page, and that temporarily stores images by the unit of one page. In the case of color data, each color corresponds to a page.

In the successive printing operations corresponding to Bk, C, M, and Y as shown in FIG. 14, there may be a case in which the image data of respective colors do not exist in the page memory (i.e., the primary memory device 606), but are present in the secondary memory device 607, the Bk image is retrieved first from the secondary memory device 607 to the page memory, followed by the Bk-image forming process. Once an image forming cycle starts with the Bk-image forming process, it is not possible to suspend the image forming cycle. Successive image forming processes in respect of C, M, and Y must be performed at constant intervals T that reflect the rate of rotation of the intermediary transfer belt 261. Because of this, the image data of Bk, C, M, and Y must be retrieved from the secondary memory device 607 to the page memory before the respective image forming processes of Bk, C, M, and Y start, as shown in FIG. 14.

If the page memory (i.e., the primary memory device 606) has a sufficient memory space, the image data of all the colors may be retrieved from the secondary memory device 607 in advance, and may be set aside for use in the page memory. However, there is a need to use the finite memory space of the primary memory device 606 for both the image inputting purpose and the image outputting purpose, and it is generally difficult to secure a memory space for four images at once. In consideration of this, images may be retrieved one by one from the secondary memory device 607 for subsequent printing. Alternatively, a memory space that is equal in size to two pages is prepare for use by Bk and C, followed by subsequent use thereof by M and Y.

In the color printing unit of the single-drum type as described above, once the image forming operation starts, the image forming processes corresponding to Bk, C, M, and Y must be performed at predetermined intervals, which makes it necessary to prepare the image data of these colors before they are required for printing. The control of image data transfer according to the present invention involves interruption control, thereby making it possible to prepare the image data for printing at high speed. Accordingly, the present invention, when applied to a color printing process based on the single-drum configuration, can achieve reliable printing operations by transferring the output image data successively at required timings after the commencement of an image forming cycle.

It should be noted that data input into the primary memory device 606 (i.e., data captured by the scanner) can be let wait as necessary. This is because it suffices to start the image scan operation of a scanner only after an available memory space is secured in the primary memory device 606. Even if data outputting from the primary memory device 606 is given priority over data inputting, therefore, the data inputting will not suffer any trouble. The data outputting is yet given an advantage in that a reliable printing operation as described above is achieved.

The above description has been given with regard to the control of transfer between the primary memory device and the secondary memory device in terms of interruption of image-data transfer. No description has been given, however, of the detail of a means to achieve interruption. In the following, transfer between the primary memory device and the secondary memory device will be described in terms of how to achieve interruption.

In what follows, the processing of image data is regarded as a job that is conceptually equivalent to a software process. The start and stop of this job are linked to the acquisition and release of necessary resources, thereby making it possible to achieve interruption through proper control of job execution.

Figure 15:
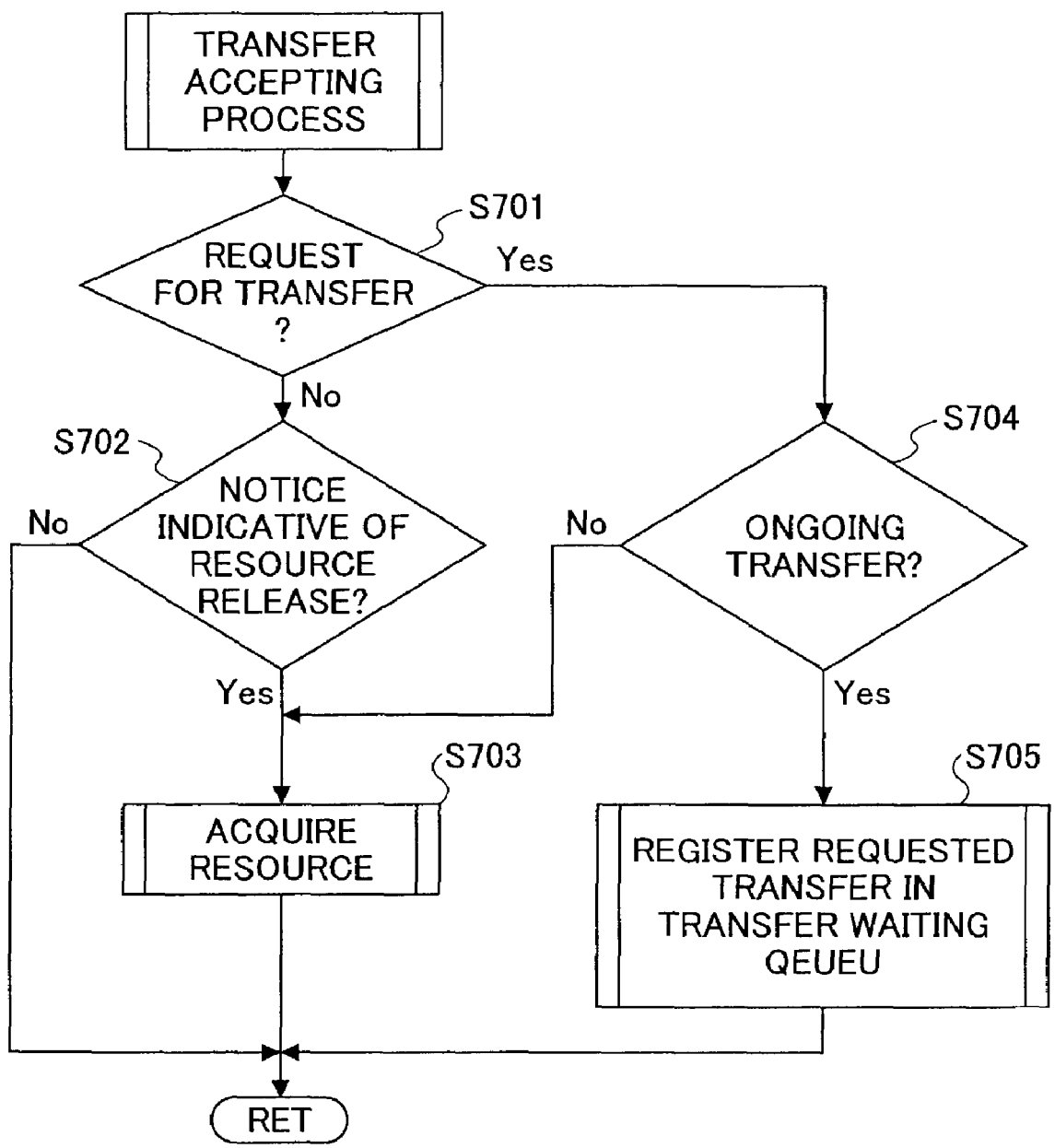
FIG. 15 is a flowchart showing the process of accepting a transfer request when the request is made to transfer data from the secondary memory device to the primary memory device.

FIG. 15 is a flowchart showing the process of accepting a transfer request when the request is made to transfer data from the secondary memory device 607 to the primary memory device 606.

The process of accepting a transfer request shown in FIG. 15 is implemented as a program module that is executed for each transfer operation. This module is called and executed when a transfer request is made or when a resource release notice is received as will be described with respect to step S1104 of FIG. 19.

A check is made (step S701) as to whether there is a transfer request. If a transfer request is made (Yes at step S701), a check is made (step S704) as to whether the secondary memory device 607 is being used (for data transfer). If data transfer is underway (Yes at step S704), the transfer request is registered in a transfer waiting queue that contains standby transfer requests (step S705).

Figure 16:
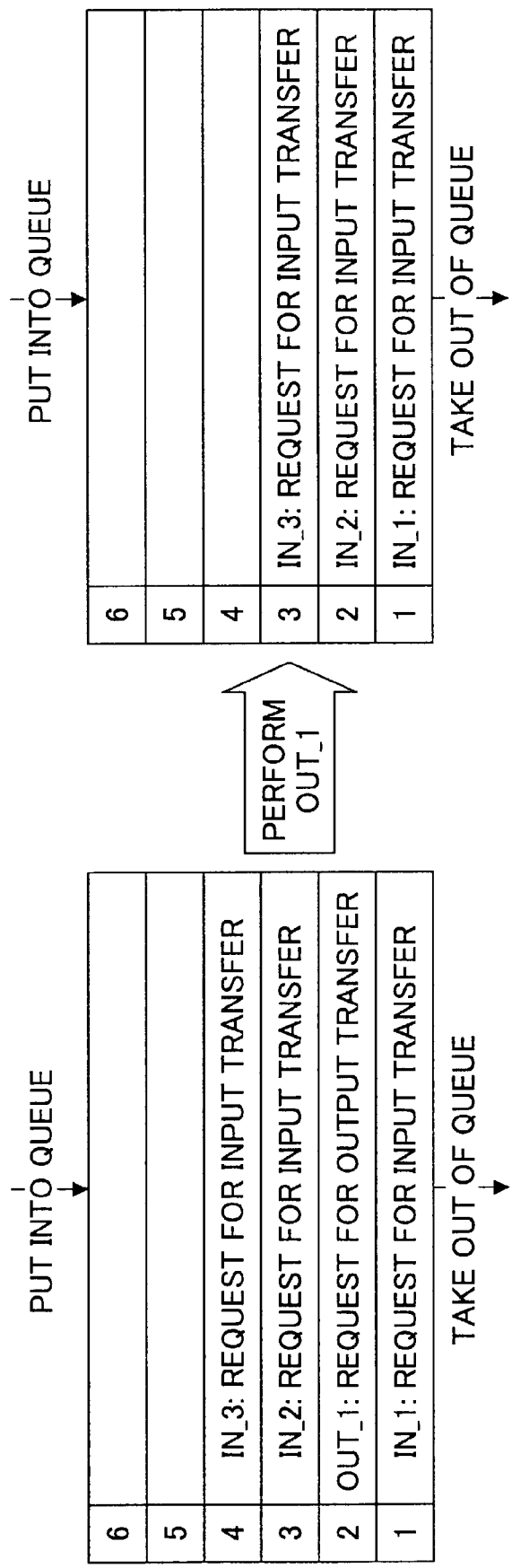
FIG. 16 is an illustrative drawing showing a transfer waiting queue.

When transfer is let wait, transfer processes are successively performed in an order in which they are waiting as shown in FIG. 16. A requested transfer is registered in the transfer waiting queue shown in FIG. 16 at step S705 of FIG. 15.

As transfer requests are accumulated in the queue, the state shown in FIG. 16 indicates that IN_1, OUT_1, IN_2, and IN_3 are registered in this order in the queue. When new registration is requested, a new entry is entered at slot No. 5 as it is available in the queue. Here, "IN" refers to a transfer process for input image data, and "OUT" refers to a transfer process for output image data (for printing).

If no transfer is underway (No at step S704), thereby indicating that the secondary memory device 607 is available, resource acquisition is performed (step S703), followed by the execution of a transfer process. The detail of resource acquisition (step S703) will be described later.

Even if there is no transfer request (No at step S701), the issuing of a resource release notice (Yes at step sS702) indicates a newly available state of the secondary memory device 607, and is thus ensued by resource acquisition (step S703) and a subsequent transfer process.

Figure 17:
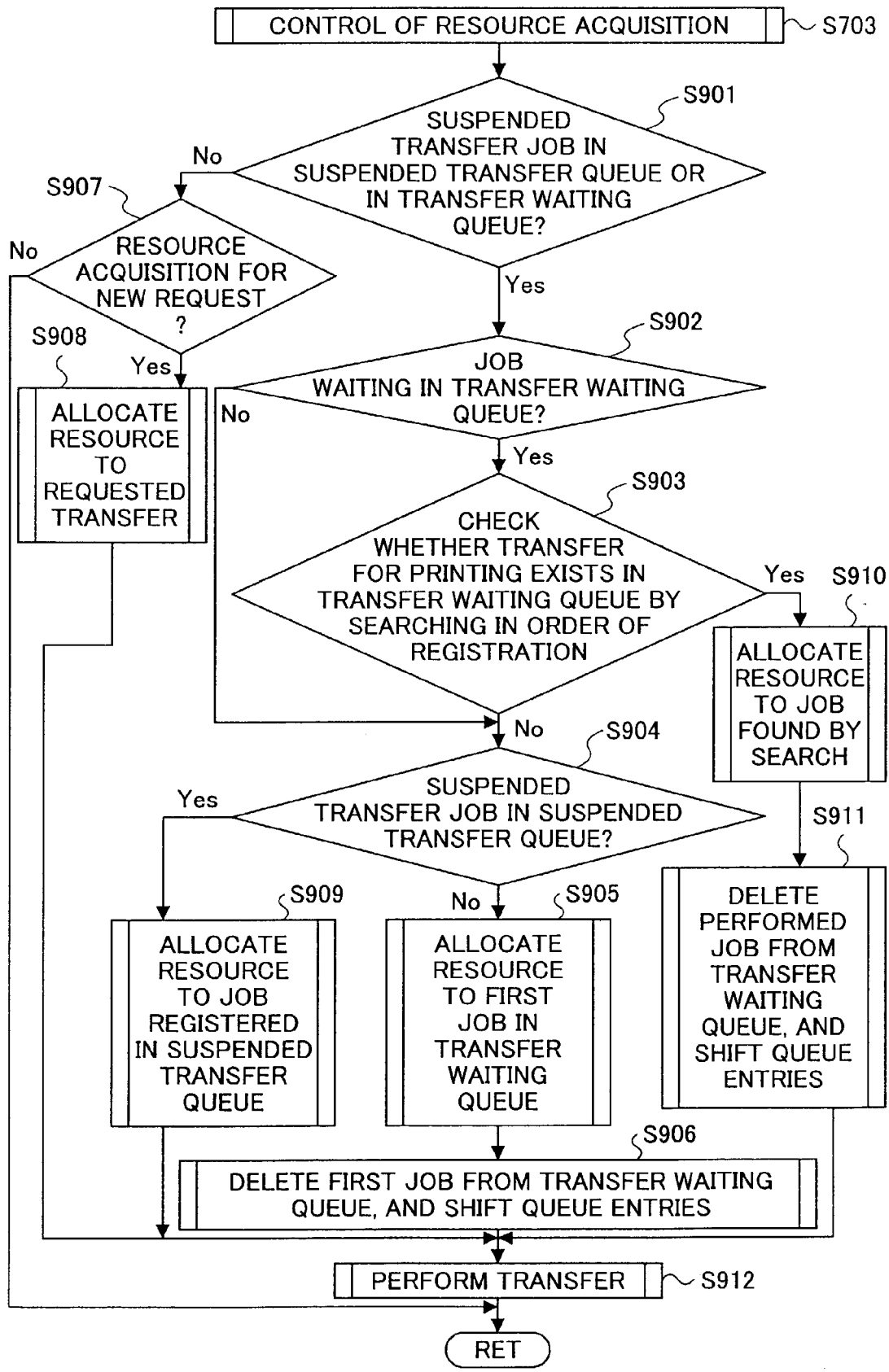
FIG. 17 is a flowchart showing the detail of resource acquisition.

FIG. 17 is a flowchart showing the detail of resource acquisition (step S703 of FIG. 15). If there are conflicting resource acquisition requests (i.e., if more than one job is requesting the use of resources), jobs that are waiting to acquire resources are reevaluated as to their ranks in the order in which the jobs are given resources. The resource acquisition process shown in FIG. 17 is called and executed when a new transfer request is made or when resources are released.

A check is made (step S901) as to whether there is a suspended transfer job in the transfer waiting queue or in the suspended transfer queue. If there is such a job (Yes at step S901), a check is made (step S902) as to whether there is a transfer waiting job in the transfer waiting queue. If there is such a job (Yes at step S902), entries in the transfer waiting queue are searched through in the registered order, and a check is made (step S903) as to whether there is a transfer request for printing (i.e., the retrieval of image data from the secondary memory device 607). If no transfer request for printing is in existence (No at step S903), or if no transfer waiting job is in existence (No at step S902), a check is made (step S904) as to whether there is a suspended transfer job in the suspended transfer queue.

A series of steps "step S901, step S902, step S903, and step S904" checks whether there are conflicting resource acquisition requests, which is done by searching for a waiting job in the transfer waiting queue or in the suspended transfer queue. The order in which resources are allocated is dependent on the order in which the series of steps "step S901, step S902, step S903, and step S904" is performed. The order between different types of jobs is as follows.

Resource Acquisition Request for Printing
Resource Acquisition Request by Suspended Transfer
Resource Acquisition Request for Inputting According to the priority defined above, the order in which resources are allocated can be determined, and insures that the transfer of output image data from the secondary memory device 607 is given highest priority so as to have the print image prepared properly. Further, the print image can be prepared reliably at fast speed, thereby achieving efficient printing operations.

If there is no suspended transfer job in the suspended transfer queue or in the transfer waiting queue (No at step S901), a check is made as to whether the resource acquisition is directed to a new transfer request (step S907). If it is (Yes at step S907), the resource is allocated to the requested transfer job (step S908), and, then, the transfer job having the resources allocated thereto is performed (step 5912). If the resource acquisition is not directed to a new transfer request (No at step S907), the resource acquisition process comes to an end without executing a transfer process.

Figure 18:
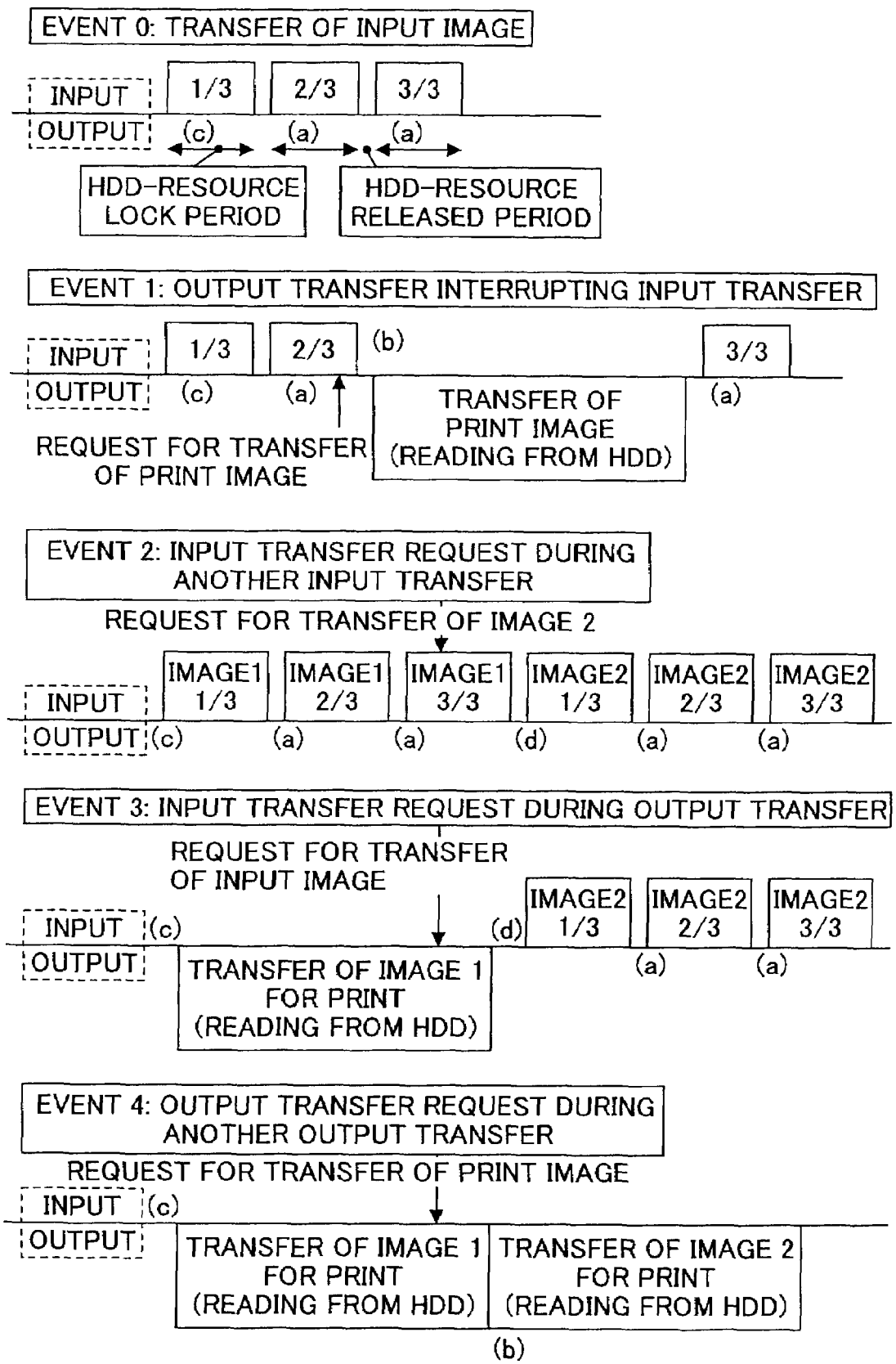
FIG. 18 is a timing chart for explaining various examples of resource lock operations in respect of the secondary memory device.

A series of steps "step S907, step S908, and step S912" corresponds to a case in which no suspended transfer is present, and a new transfer request is made while no waiting job is present in the transfer waiting queue (see timing (c) in FIG. 18).

FIG. 18 is a timing chart for explaining various examples of resource lock operations in respect of the secondary memory device 607 (which is a hard drive in this example). As shown in FIG. 18, there are four different events 0 through 4. In each event, a portion above a horizontal line represents image-data input operations, and a portion below the horizontal line illustrates image-data output operations. The events 0-4 shown in FIG. 18 are as follows:

Event 0) repeated acquisition and release of resources during the transfer of an input image;

Event 1) transfer of print data during the transfer of an input image;

Event 2) request for transfer of an input image during the transfer of another input image;

Event 3) request for transfer of an input image during the transfer of print (output) image; and Event 4) request for transfer of a print image during the transfer of another print (output) image.

At the timing (c) of FIG. 18, the resource is allocated to a requesting job without an exception.

If there is a suspended transfer job in the suspended transfer queue (Yes at step S904), the resource is allocated to the transfer job registered in the suspended transfer queue (step S909), followed by the execution of a transfer operation (step S912).

The series of steps "step S909 and step S912" belongs to a case in which there is a suspended transfer job, and no job is waiting in the transfer waiting queue or even if there is a job waiting in the transfer waiting queue, this waiting job is not for the transfer of print data. This corresponds to the timing (a) shown in FIG. 18. Since no transfer of print data is requested, the resource is allocated to the suspended transfer job in order to resume its operation.

If there is no suspended transfer job in the suspended transfer queue (No at step S904), the resource is allocated to a transfer job that is the first (i.e., first to be registered) in the transfer waiting queue (step S905). This job that is the first in the queue is removed from the queue, and, then, the queue entries are shifted to fill the vacant space (step S906), followed by the execution of a transfer operation (step S912).

The series of steps "step S905, step S906, and step S912" belongs to a case in which there is no suspended transfer job, and no job is waiting in the transfer waiting queue or even if there is a job waiting in the transfer waiting queue, this waiting job is not for the transfer of print data. This corresponds to the timing (d) shown in FIG. 18. Since no transfer of print data is requested, and no suspended transfer job is in existence, the transfer job that is the first to be requested in the transfer waiting queue is executed in this case.

If a transfer request for print data (i.e., a request for image-data retrieval from the secondary memory device 607) is found as a result of a search that is made through entries in the transfer waiting queue in the order of registration, the resource is allocated to the transfer job for printing data that is found by the search (step S910). The first job in the transfer waiting queue is then deleted from the queue, and the entries are shifted in the queue (step S911), followed by the execution of a transfer operation (step S912).

The series of steps "step S910, step S911, and step S912" corresponds to a case in which a job is waiting in the transfer waiting queue, and that is a job for print-data transfer. In this case, the resource is preferentially allocated to the transfer of print data. This insures the preferential treatment of output jobs, and makes it possible to reliably prepare images for printing.

Figure 19:
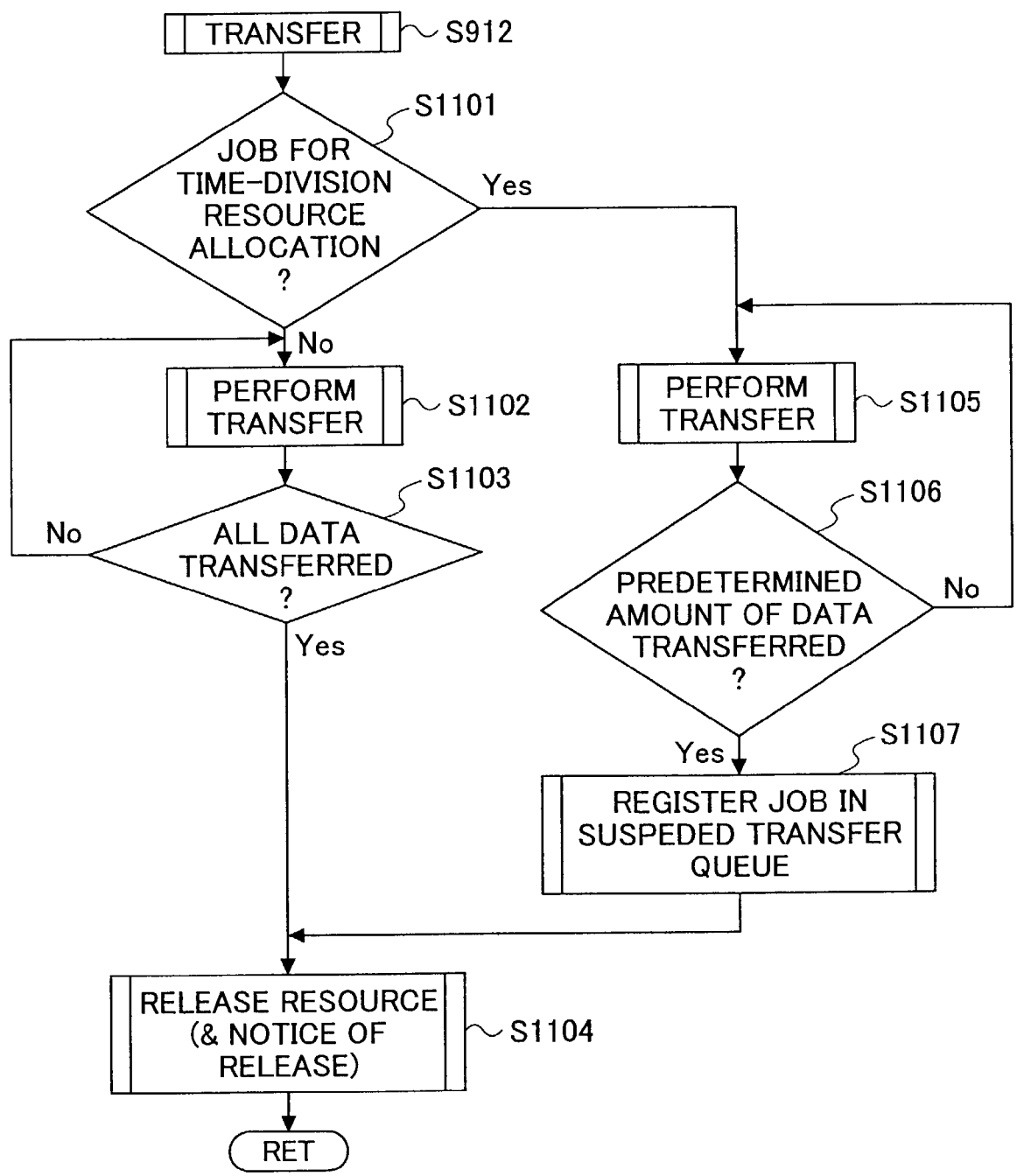
FIG. 19 is a flowchart showing the detail of a transfer process in relation to resource acquisition.

FIG. 19 is a flowchart showing the detail of a transfer process (step S912 of FIG. 17) in relation to resource acquisition. FIG. 19 shows a control process that repeats resource acquisition and release multiple times where each set of resource acquisition and release corresponds to the data transfer of a predetermined size. The resource lock state and the resource release state of the secondary memory device (HDD) 607 are illustrated in FIG. 18, Event 0.

When a job having the resource allocated thereto is to be executed for data transfer (step S912), a check is made (step S1101) as to whether the job is of such a type as to be controlled by a time-division-resource-allocation method (which repeats resource acquisition and release multiple times). When printing is given priority (i.e., when the outputting of image data from the secondary memory device 607 is given priority), the process of transferring an input image is divided into a plurality of sub-processes, and the acquisition and release of resources are repeated multiple times.

If the job having the resource allocated thereto is not a type that is subjected to the time-division resource allocation (No at step S1101), data transfer is carried out (step S1102), followed by a check being made as to whether all the data has been transferred (step S1103). These two steps are repeated until the transfer of all the data is completed (Yes at step S1103). Thereafter, the resource (i.e., the secondary memory device 607) is released, and a notice is sent to the transfer request reception process (see FIG. 15) to report that the resource is now available (step S1104).

As shown in Event 1, 3, and 4 of FIG. 18, the transfer job for printing continues its exclusive use of the resource until the end of transfer. This insures that a print image is prepared at the highest speed once the acquisition of the resource takes place.

If the job is of a type that is subjected to the time-division resource allocation (which repeats resource acquisition and release multiple times) (Yes at step S1101), data transfer (step S1105) and a check as to whether the transfer of data having a predetermined size is completed (step S1106) are repeated. When the transfer of data having a predetermined size is completed (Yes at step S1106), the job is registered in the suspended transfer queue (step S1107), and the resource (i.e., the secondary memory device 607) is released (step S1104) even if the transfer of the entire data is not yet completed. This allows another request to acquire the resource and perform data transfer if this request has higher priority.

This is shown in Event 1 of FIG. 18. In Event 1, the input image data is divided into portions having a predetermined size (⅓ in this example), and a transfer request for image output is made in the middle of the transfer of the second of these three portions. Since the request is made in the middle of the transfer of input image data, the transfer of input image data is suspended, and is registered in the transfer waiting queue (step S705). When the resource is released after the transfer of the second of the three portions is completed, the resource is allocated to the transfer of print data at the timing (b) since the printing (i.e. the outputting of data from the secondary memory device 607) has higher priority in terms of resource acquisition.

In this manner, some delay is incurred from the time of a transfer request for printing to the time of resource acquisition. In order to insure proper image preparation for printing, the time required from resource acquisition to resource release in the case of time-division resource allocation needs to be specifically defined.

Namely, when resource acquisition and subsequent release are repeated multiple times, the following condition needs to be satisfied in order to insure proper image preparation.

Time from Resource Acquisition to Resource Release<Tolerable Time Limit from Transfer Request to Transfer Completion−Time Required for Image Transfer The resource is released in order to allow the transfer of a print image to use the resource. If the resource is not released by such a time as to allow the image transfer to complete within the tolerable time limit from a transfer request to a completion of transfer, an intended purpose will be undermined. The time from resource acquisition to resource release is thus determined such as to satisfy the above-identified condition, thereby insuring proper image preparation for image printing.

Figure 20:
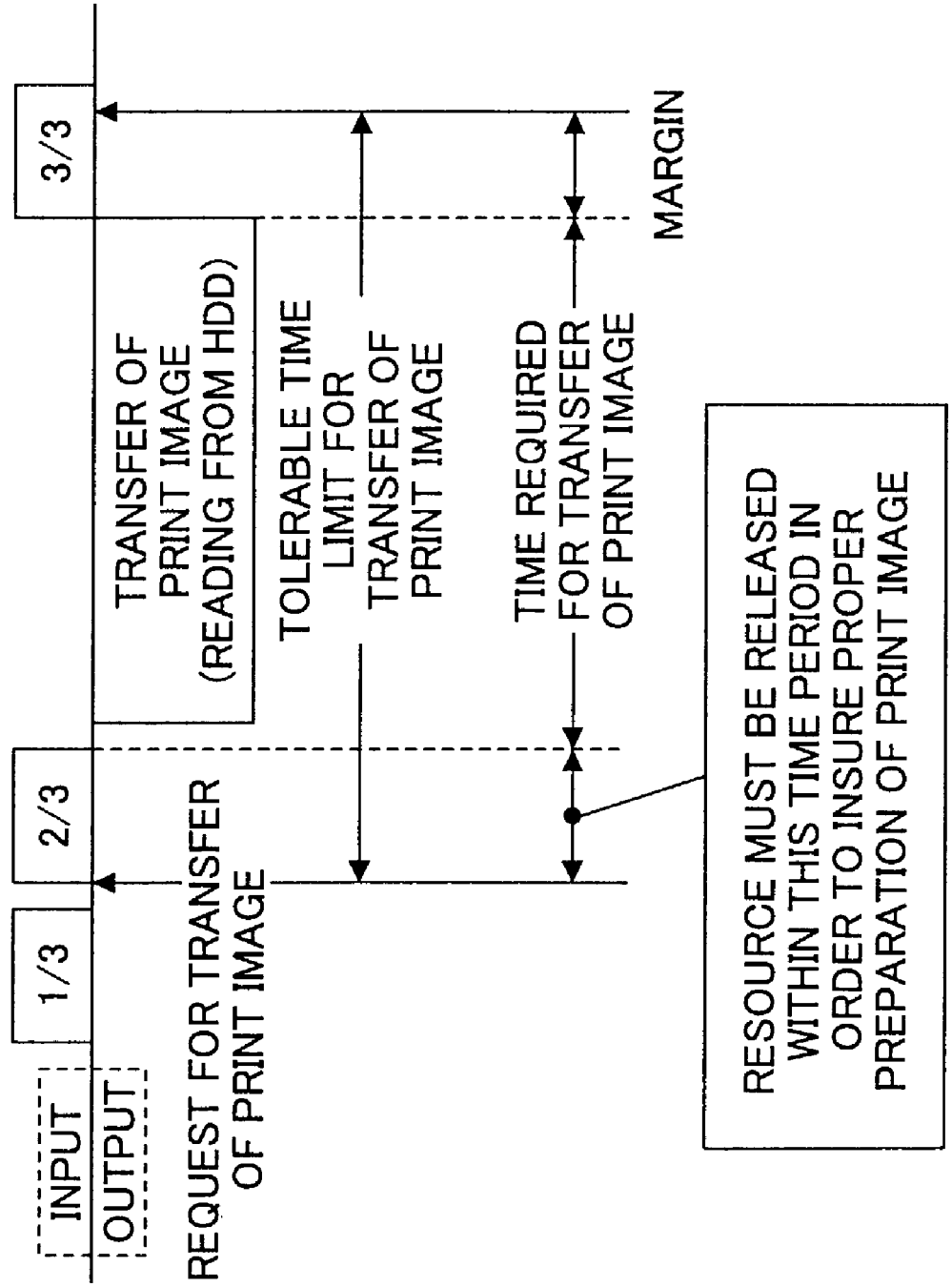
FIG. 20 is a timing chart for explaining the timing of resource release.

FIG. 20 is a timing chart for explaining the timing of resource release. The shorter the time period from resource acquisition to resource release, the more reliable the image preparation can be, thereby providing an extra time margin. If the resource acquisition and release are repeated at extremely short intervals, however, the number of divided transfer processes may become exceedingly large, resulting in an increase of overhead and inefficiency.

Accordingly, the size of the divided portions is determined such as to provide a proper transfer time margin. It should be noted that if a timer is used to control the transfer time, software overhead for the purpose of time management may be too great, thereby degrading efficiency. To avoid this, the provision may be made to compute the transfer time from the transfer size and the transfer speed, which enhances efficiency by reducing the load of software. With this provision, the present invention can achieve preferential printing and prepare print image reliably at high speed, thereby attaining highly efficient print operations.

In the resource management as described above, the image data is stored in the image memory 506 first, and, then, the data is transferred from the primary memory device 606 to the secondary memory device 607 such as an HDD. When this data transfer is to be performed, the image data is already present in the primary memory device 606, so that the image data can be divided into small portions, each of which is then separately transferred to and stored in the secondary memory device 607. Because of this, the exclusive use of the resource is not an issue at the time of data inputting.

On the other hand, if image data captured by a scanner is stored in the image memory 506 (i.e., the primary memory device 606), allocation of the resource to another job during a slow data capture by the scanner may result in a failure to properly capture the image data. In the case of such a job, the scanner resource needs to be set aside for exclusive use from the start to the end of data capture even though the job is directed to inputting of image data. In addition, control must be instituted to prohibit other jobs to use the resources.

As described above, there are mainly two types of resources in the image forming apparatus of the present invention. According to the type of the job, the form of resource management is switched, thereby achieving optimum resource control. Such switching of control may be achieved by assigning priority levels and the indications of the presence/absence of divided transfer on a job-type-specific basis.

In the description provided above, the transfer of image data is regarded as a job that is conceptually similar to a software process, and the acquisition and release of resources are linked to the start and stop of a job, thereby controlling the progress of the job in such a manner as to provide interruption control. In the present invention, the interruption control achieved through means of resource acquisition and release has its application not only to the transfer of image data but also to the other types of image data processing.

Figure 21:
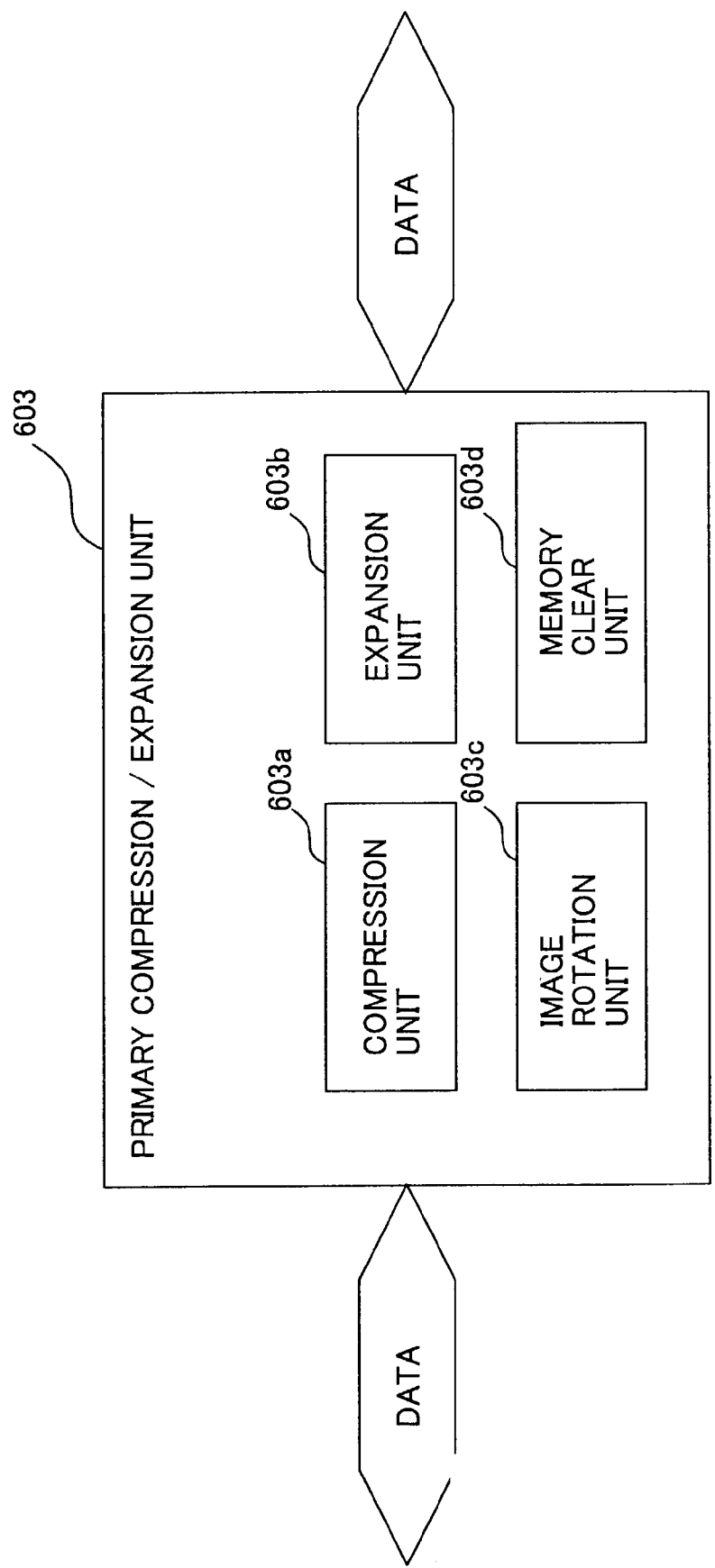
FIG. 21 is a block diagram showing the resource configuration of a primary compression/expansion unit shown in FIG. 6.

FIG. 21 is a block diagram showing the resource configuration of the primary compression/expansion unit 603 shown in FIG. 6.

As shown in FIG. 21, the primary compression/expansion unit 603 includes a compression unit 603a, an expansion unit 603b, an image rotation unit 603c, and a memory clear unit 603d.

The compression unit 603a is a resource for carrying out an image compression process, and compresses image data processed by the image synthesis unit 602. The compressed data is stored in the primary memory device 606. The expansion unit 603b is a resource for carrying out an image expansion process, and expands image data stored in the primary memory device 606. The expanded data is output for use in printing or the like. The image rotation unit 603c is a resource for carrying out an image rotation process, and is used to rotate an image by an angle specified by a user when the image is printed out. The memory clear unit 603d is a resource for carrying out a memory erasure operation, and sets all the memory bits to "0" by deleting the data stored in the primary memory device 606.

In the present invention, a job that is to be performed is divided according to time-division control, and the divided portions are successively subjected to resource acquisition and release so as to complete the job while allowing another job to interrupt to use the resource. Alternatively, a job is performed incessantly (i.e., without a break from the start to the end) through one time acquisition and release of the resource, thereby completing without allowing another job an interrupting use of the resource. Such resource control is applicable to the above-identified resources and the corresponding processes where the resources may include the compression unit 603a, the expansion unit 603b, the image rotation unit 603c, and the memory clear unit 603d. In this case, the HDD resource is replaced by a selected one of the above-identified resources, and a transfer job is substituted for by the process corresponding the selected one of the resources in FIG. 15 and FIG. 17 through FIG. 20. This makes it possible to attend to resource management in the same manner as described above.

The transfer and processing of image data according to the present invention as described above may be implemented by use of a program executed by a computer such as a personal computer, a workstation, or the like. This program is recorded in a computer-readable record medium such as a hard disk, a floppy disk, a CD-ROM, an MO, or a DVD, and is executed by the computer as the computer reads the program from the record medium. Further, such program can be delivered from the record medium to other locations through a network such as the Internet.

Figure 22:
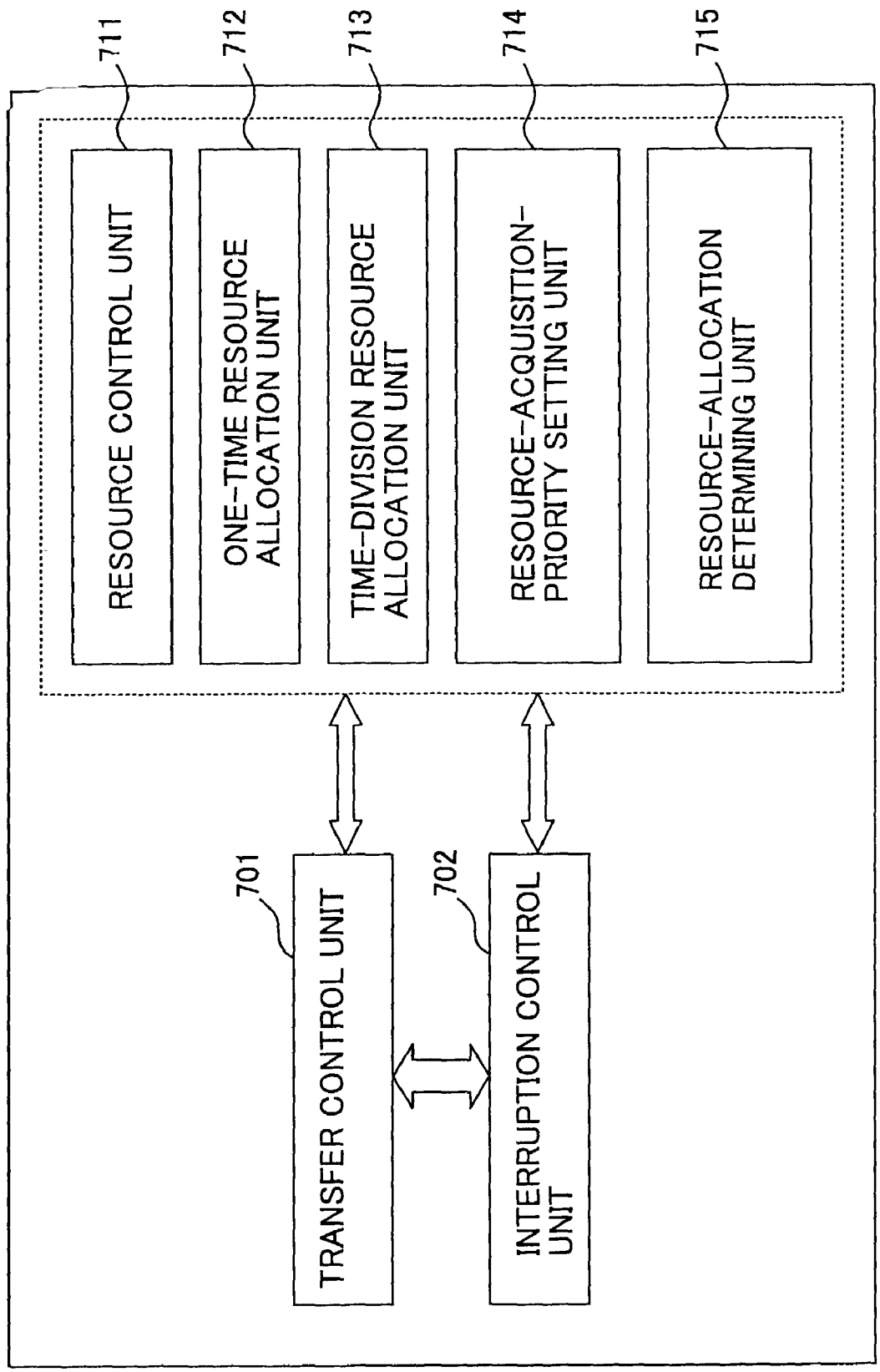
FIG. 22 is a block diagram showing functional units of a program according to the present invention.

FIG. 22 is a block diagram showing functional units of the program described above. As shown in FIG. 22, the program for data transfer and interruption control according to the present invention includes a transfer control unit 701, an interruption control unit 702, a resource control unit 711, a one-time resource allocation unit 712, a time-division resource allocation unit 713, a resource-acquisition-priority setting unit 714, and a resource-allocation determining unit 715. The transfer control unit 701 executes and controls the data transfer between the primary memory device 606 and the secondary memory device 607 in response to a request for inputting of image data and a request for outputting of image data. The interruption control unit 702 controls the interruption of the data transfer. In order to carry out data transfer and interruption control, the resource control unit 711, the one-time resource allocation unit 712, the time-division resource allocation unit 713, the resource-acquisition-priority setting unit 714, and the resource-allocation determining unit 715 are used.

The resource control unit 711 assigns the one-time resource allocation or the time-division resource allocation to each job, depending on whether each job needing the resource is of a type that allows another job to interrupt, or is of a type that does not allow another job to interrupt. The time-division resource allocation is performed by the time-division resource allocation unit 713, and executes a job by dividing the job into sub-sections and by consecutively performing the acquisition and release of the resource for each sub-section. The one-time resource allocation is performed by the one-time resource allocation unit 712, and executes a job incessantly (i.e., without a break from the start to the end) by performing the acquisition and release of the resource only once for the job. The resource-acquisition-priority setting unit 714 sets priority levels of jobs regarding the acquisition of the resource when there are conflicting requests for the resource. The resource-allocation determining unit 715 acquires the resource, and determines the job that is to use the acquired resource according the priority level determined by the resource-acquisition-priority setting unit 714.

The functional unit configuration of FIG. 22 is applicable not only to the implementation of the interruption control of the present invention based on the use of a computer such as a personal computer or a workstation, but is also applicable to the configuration of the image forming apparatus of FIG. 5 in which the interruption control of the present invention is performed by the CPU 508. Namely, the CPU 508 reads and writes data from and to the image memory 506 (i.e., the primary memory device 606 and the secondary memory device 607) via the image memory controller 505, and uses the functional units as shown in FIG. 22 to attend to the control of data transfer, the interruption control, the resource control, etc.

Further, the present invention is not limited to these embodiments, but various variations and modifications may be made without departing from the scope of the present invention.

The present application is based on Japanese priority applications No. 2001-229233 and No. 2001-229234 both filed on Jul. 30, 2001, with the Japanese Patent Office, the entire contents of which are hereby incorporated by reference.

What is claimed is:

1. An information processing apparatus, which attends to inputting and outputting of image data, and processes the image data by performing a job that uses a resource, comprising:
   a time-division resource allocation unit which performs the job by consecutively performing resource acquisition and release for job subsections into which the job is divided;
   a one-time resource allocation unit which performs the job without a break from a start to an end thereof by performing resource acquisition and release only once for the job; and a resource control unit which selects one of said time-division resource allocation unit and said one-time resource allocation unit to be applied to the job in response to a type of the job based on determining whether a transfer request is directed to inputting image data to a memory or outputting image data from the memory for printing, wherein the time-division resource allocation unit is applied when the transfer request is directed to inputting data to the memory for scanning of the image data, and the one-time resource allocation unit is applied when the transfer request is directed to outputting data from the memory for printing of the image data, such that processes for the printing of the image data are executed without interruption and processes for the inputting of the image data can be interrupted.

2. The information processing apparatus as claimed in claim 1, wherein said resource control unit selects said time-division resource allocation unit to be applied if the job is of a type that allows another job to interrupt, and selects said one-time resource allocation unit to be applied if the job is of a type that prohibits another job from interrupting.

3. The information processing apparatus as claimed in claim 1, further comprising:
  a resource-acquisition-priority-level setting unit which assigns priority levels to a plurality of jobs; and
  a resource-allocation determining unit which selects a job that is to use the resource based on the priority levels assigned by said resource-acquisition-priority-level setting unit if there are conflicting requests for use of the resource.

4. The information processing apparatus as claimed in claim 3, wherein if there are a plurality of jobs requesting use of a given resource at a time the given resource is released, said resource-allocation determining unit allocates the given resource to a job that has a highest priority level assigned by said resource-acquisition-priority-level setting unit.

5. The information processing apparatus as claimed in claim 3, wherein if a resource used by a given job is released, and is subsequently acquired by another job while said time-division resource allocation unit is performing the given job, the given job is registered in a suspended job queue.

6. The information processing apparatus as claimed in claim 5, wherein the job registered in the suspended job queue has a priority level higher than another job that is performed by said time-division resource allocation unit and not registered in said suspended job queue.

7. The information processing apparatus as claimed in claim 5, wherein a job performed by said one-time resource allocation unit has a priority level higher than a job registered in said suspended job queue.

8. The information processing apparatus as claimed in claim 1, further comprising:
  a memory device which stores the image data therein;
  a compression unit which compresses the image data; and
  an expansion unit which expands the image data, wherein the job uses at least one of said memory device, said compression unit, and said expansion unit as the resource.

9. A method of controlling jobs in an information processing apparatus, which attends to inputting and outputting of image data, and processes the image data by performing a job that uses a resource, comprising:

a time-division resource allocation step of performing the job by consecutively performing resource acquisition and release for job subsections into which the job is divided;
  a one-time resource allocation step of performing the job without a break from a start to an end thereof by performing resource acquisition and release only once for the job; and
  a resource control step of selecting one of said time-division resource allocation step and said one-time resource allocation step to be applied to the job in response to a type of the job based on determining whether a transfer request is directed to inputting image data to a memory or outputting image data from the memory for printing, wherein the time-division resource allocation unit is applied when the transfer request is directed to inputting data to the memory for scanning of the image data, and the one-time resource allocation unit is applied when the transfer request is directed to outputting data from the memory for printing of the image data, such that processes for the printing of the image data are executed without interruption and processes for the inputting of the image data can be interrupted.

10. The method as claimed in claim 9, wherein said resource control step selects said time-division resource allocation step to be applied if the job is of a type that allows another job to interrupt, and selects said one-time resource allocation step to be applied if the job is of a type that prohibits another job from interrupting.

11. The method as claimed in claim 9, further comprising:
  a resource-acquisition-priority-level setting step of assigning priority levels to a plurality of jobs; and
  a resource-allocation determining step of selecting a job that is to use the resource based on the priority levels assigned by said resource-acquisition-priority-level setting step if there are conflicting requests for use of the resource.

12. The method as claimed in claim 11, wherein if there are a plurality of jobs requesting use of a given resource at a time the given resource is released, said resource-allocation determining step allocates the given resource to a job that has a highest priority level assigned by said resource-acquisition-priority-level setting unit.

13. The method as claimed in claim 11, further comprising a registration step, wherein if a resource used by a given job is released, and is subsequently acquired by another job while said time-division resource allocation step is performing the given job, said registration step registers the given job in a suspended job queue.

14. The method as claimed in claim 13, wherein the job registered in the suspended job queue has a priority level higher than another job that is performed by said time-division resource allocation step and not registered in said suspended job queue.

15. The method as claimed in claim 13, wherein a job performed by said one-time resource allocation step has a priority level higher than a job registered in said suspended job queue.

16. The method as claimed in claim 9, wherein the job is at least one of a process of storing the image data in memory, a process of compressing the image data, and a process of expanding the image data.

17. A computer-readable record medium having a program embodied therein for causing a computer to perform a method of controlling jobs in an information processing apparatus, which attends to inputting and outputting of image data, and processes the image data by performing a job that uses a resource, said program comprising:
- a time-division resource allocation step of performing the job by consecutively performing resource acquisition and release for job subsections into which the job is divided;
- a one-time resource allocation step of performing the job without a break from a start to an end thereof by performing resource acquisition and release only once for the job; and
- a resource control step of selecting one of said time-division resource allocation step and said one-time resource allocation step to be applied to the job in response to a type of the job based on determining whether a transfer request is directed to inputting image data to a memory or outputting image data from the memory for printing, wherein the time-division resource allocation unit is applied when the transfer request is directed to inputting data to the memory for scanning of the image data, and the one-time resource allocation unit is applied when the transfer request is directed to outputting data from the memory for printing of the image data, such that processes for the printing of the image data are executed without interruption and processes for the inputting of the image data can be interrupted.

18. The computer-readable record medium as claimed in claim 17, wherein said resource control step selects said time-division resource allocation step to be applied if the job is of a type that allows another job to interrupt, and selects said one-time resource allocation step to be applied if the job is of a type that prohibits another job from interrupting.

* * * * *